United States Patent
Nakano et al.

(10) Patent No.: US 11,853,599 B2
(45) Date of Patent: Dec. 26, 2023

(54) MEMORY SYSTEM AND INFORMATION PROCESSING SYSTEM

(71) Applicant: KIOXIA CORPORATION, Tokyo (JP)

(72) Inventors: Takeshi Nakano, Kawasaki Kanagawa (JP); Akihiko Ishihara, Yokohama Kanagawa (JP); Shingo Tanimoto, Yokohama Kanagawa (JP); Yasuaki Nakazato, Kamakura Kanagawa (JP); Shinji Maeda, Kawasaki Kanagawa (JP); Minoru Uchida, Yokohama Kanagawa (JP); Kenji Sakaue, Yokohama Kanagawa (JP); Koichi Inoue, Yokohama Kanagawa (JP); Yosuke Kino, Yokohama Kanagawa (JP); Takumi Sasaki, Kawasaki Kanagawa (JP); Mikio Takasugi, Kawasaki Kanagawa (JP); Kouji Saitou, Tokyo (JP); Hironori Nagai, Kamakura Kanagawa (JP); Shinya Takeda, Yokohama Kanagawa (JP); Akihito Touhata, Yokohama Kanagawa (JP); Masaru Ogawa, Ebina Kanagawa (JP); Akira Aoki, Yokosuka Kanagawa (JP)

(73) Assignee: Kioxia Corporation, Tokyo (JP)

( * ) Notice: Subject to any disclaimer, the term of this patent is extended or adjusted under 35 U.S.C. 154(b) by 226 days.

(21) Appl. No.: 17/185,104

(22) Filed: Feb. 25, 2021

(65) Prior Publication Data
US 2021/0303214 A1    Sep. 30, 2021

(30) Foreign Application Priority Data

Mar. 31, 2020  (JP) ................................ 2020-062221
Oct. 14, 2020  (JP) ................................ 2020-173167

(51) Int. Cl.
G06F 11/00  (2006.01)
G06F 3/06   (2006.01)
G06F 11/10  (2006.01)

(52) U.S. Cl.
CPC .......... *G06F 3/0659* (2013.01); *G06F 3/0604* (2013.01); *G06F 3/0679* (2013.01); *G06F 11/1068* (2013.01)

(58) Field of Classification Search
CPC .... G06F 3/0659; G06F 3/0604; G06F 3/0679; G06F 11/1068
See application file for complete search history.

(56) References Cited

U.S. PATENT DOCUMENTS 8,213,255 B2   7/2012  Hemink et al.
9,666,249 B1   5/2017  Park
(Continued)

FOREIGN PATENT DOCUMENTS

| JP | 2013-520760 A | 6/2013 |
| JP | 2017-174003 A | 9/2017 |
| JP | 2018-055759 A | 4/2018 |

*Primary Examiner* — Christine T. Tu
(74) *Attorney, Agent, or Firm* — Kim & Stewart LLP

(57) ABSTRACT

A memory system includes a non-volatile memory and a controller that includes a first memory and is configured to write log data to the first memory, including a history of commands for controlling the memory system. An information processing system includes the memory system and an information processing device configured to store an expected value and to transmit a signal that instructs the memory system to stop when a value of the log data transmitted from the memory system does not match the expected value. The expected value and the transmitted value are determined based on the log data of the memory system.

20 Claims, 18 Drawing Sheets

(56) References Cited

U.S. PATENT DOCUMENTS

| | | |
|---|---|---|
| 10,229,053 B2 | 3/2019 | Fukutomi et al. |
| 2016/0117099 A1* | 4/2016 | Prins .................. G06F 3/061 |
| | | 711/103 |
| 2016/0154594 A1 | 6/2016 | Kang |
| 2016/0344834 A1* | 11/2016 | Das .................. H04L 67/1097 |
| 2018/0090218 A1* | 3/2018 | Takada .................. G11C 16/10 |
| 2020/0097217 A1* | 3/2020 | Yeh .................. G11C 16/10 |
| 2021/0166774 A1* | 6/2021 | Cha .................. G11C 16/26 |

* cited by examiner

FIG. 3

8bit

| FW LOG | |
|---|---|
| FW LOG | |
| FW LOG | |
| CPU TYPE | OverFlow FLAG | Rsvd |
| Timer | |
| Timer | |
| Timer | |
| Timer | |
| Timer | |
| Timer | |
| Timer | |
| Timer | |
| Timer | |
| Rsvd | |
| Rsvd | |
| Rsvd | |

FIG. 4

8bit

| NAND CHANNEL CHIP NUMBER | | | |
|---|---|---|---|
| Rsvd | OverFlow FLAG | Rsvd | NAND LOG TYPE |
| Rsvd | | | |
| DQ | | | |
| Timer | | | |
| Timer | | | |
| Timer | | | |
| ENVIRONMENTAL INFORMATION | | | |

*FIG. 19*

| | 0 | 1 | 2 | 3 | 4 | 5 | 6 | 7 |
|---|---|---|---|---|---|---|---|---|
| | FRAME | | | | | | | |
| PAGE 0 | USER DATA / CORRECTION CODE | | | | | | | |
| PAGE 1 | | | | | | | | |
| PAGE 2 | | | | | | | | |
| PAGE 3 | | | | | | | | |
| PAGE 4 | | | | | | | | |
| PAGE 5 | | | | | | | | |
| PAGE 6 | | | | | | | | |
| PAGE 7 | | | | | | | | |

BLK1, OFFSET

FIG. 24A

NORMAL LOG (16 Byte)

8bit

| LOG TYPE INFORMATION | Rsvd |
|---|---|
| COMMAND ||
| CONTROL PARAMETER ||
| CONTROL PARAMETER ||
| Rsvd | PAGE ADDRESS |
| PAGE ADDRESS ||
| BLOCK ADDRESS 0 ||
| BLOCK ADDRESS 0 ||
| BLOCK ADDRESS 1 ||
| BLOCK ADDRESS 1 ||
| BLOCK ADDRESS 2 ||
| BLOCK ADDRESS 2 ||
| BLOCK ADDRESS 3 ||
| BLOCK ADDRESS 3 ||
| Timer ||
| Timer ||

FIG. 24B

NORMAL LOG (10 Byte)

8bit

| LOG TYPE INFORMATION | Rsvd |
|---|---|
| COMMAND ||
| CONTROL PARAMETER ||
| CONTROL PARAMETER ||
| Rsvd | PAGE ADDRESS |
| PAGE ADDRESS ||
| BLOCK ADDRESS 0 ||
| BLOCK ADDRESS 0 ||
| Timer ||
| Timer ||

FIG. 24C

NORMAL LOG (6 Byte)

8bit

| LOG TYPE INFORMATION | Rsvd |
|---|---|
| COMMAND ||
| CONTROL PARAMETER ||
| CONTROL PARAMETER ||
| Timer ||
| Timer ||

FIG. 24D

NORMAL LOG (16 Byte)

| 8bit | |
|---|---|
| LOG TYPE INFORMATION | Rsvd |
| COMMAND ||
| CONTROL PARAMETER ||
| CONTROL PARAMETER ||
| Rsvd | PAGE ADDRESS |
| PAGE ADDRESS ||
| BLOCK ADDRESS 0 ||
| BLOCK ADDRESS 0 ||
| BLOCK ADDRESS 1 ||
| BLOCK ADDRESS 1 ||
| BLOCK ADDRESS 2 ||
| BLOCK ADDRESS 2 ||
| BLOCK ADDRESS 3 ||
| BLOCK ADDRESS 3 ||
| Timer ||
| Timer ||

MEMORY SYSTEM AND INFORMATION PROCESSING SYSTEM

CROSS-REFERENCE TO RELATED APPLICATIONS

This application is based upon and claims the benefit of priority from Japanese Patent Application No. 2020-062221 filed Mar. 31, 2020 and Japanese Patent Application No. 2020-173167 filed Oct. 14, 2020, the entire contents of which are incorporated herein by reference.

FIELD

Embodiments described herein relate generally to a memory system and an information processing system.

BACKGROUND

In recent years, as the capacity of non-volatile memory such as NAND flash memory increases, high performance of a controller that controls the non-volatile memory has become more important. As the performance of the controller improves, however, a memory system including the controller and the non-volatile memory has become more complex, and there is a concern that the man-hours required for failure analysis will increase. Further, the acquisition of the information useful for the failure analysis is required.

DESCRIPTION OF THE DRAWINGS

FIG. 3 is a diagram showing a write format of an FW log data according to the first embodiment.

FIG. 4 is a diagram showing a write format of NAND access log data according to the first embodiment.

FIG. 19 is a diagram showing an arrangement of data stored in a block according to a fourth embodiment.

FIGS. 24A-24D are diagrams each showing a format of log data according to a fifth embodiment.

DETAILED DESCRIPTION

Embodiments provide a memory system and an information processing system that facilitates failure analysis.

In general, according to one embodiment, the memory system of the embodiment includes a non-volatile memory and a controller that includes a first memory and is configured write log data to the first memory, including a history of commands for controlling the memory system.

Hereinafter, embodiments of the disclosure will be described.

In the present specification, some elements are given a plurality of expressions. These expressions are merely examples, and other expressions may be added thereto. Further, other expressions may be given to an element to which a plurality of expressions are not given. In the following description, elements having the same functional configuration are designated by a common reference sign.

The drawings are schematic, and the relationship between the thickness and the plane dimensions or the ratio of the thickness of each layer or the like may differ from the actual ones. Further, there may be parts in which the relationship and ratio of dimensions differ across the drawings.

First Embodiment

Figure 1:
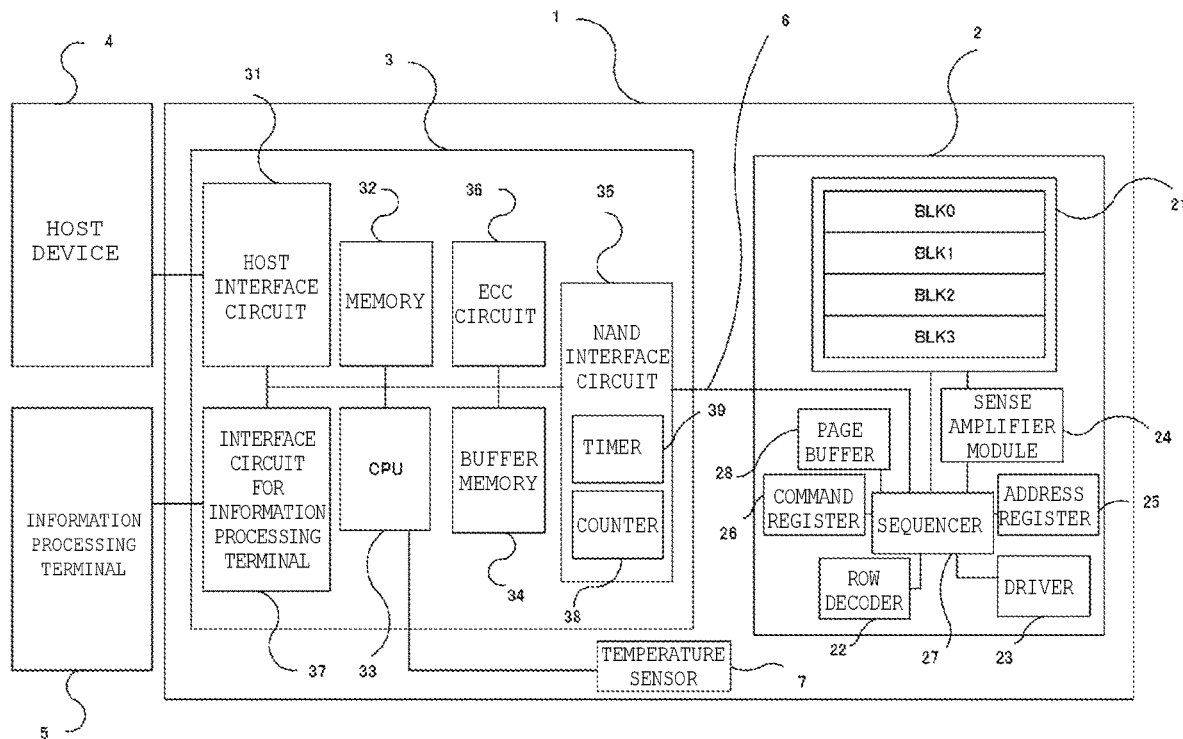
FIG. 1 is a block diagram of a memory system according to a first embodiment.

FIG. 1 is a block diagram showing a configuration example of a memory system 1 according to the present embodiment. The memory system 1 is electrically connected to a host device 4 and an information processing terminal 5, and is used as an external storage device of the host device 4. The memory system 1 is, for example, a memory card such as an SD® card or a solid state drive (SSD). The host device 4 is, for example, a personal computer (PC), a mobile phone, an image capturing device, a tablet computer, a smartphone, a game device, a car navigation system, or a data server. The memory system 1 includes a non-volatile memory 2, a controller 3, and a temperature sensor 7.

The non-volatile memory 2 is a memory that stores data in a non-volatile manner, and is, for example, a NAND flash memory or a NOR flash memory. Hereinafter, the non-volatile memory 2 will be referred to as a NAND flash memory 2. A plurality of NAND flash memories 2 may be provided. The NAND flash memory 2 is connected to the controller 3 through a NAND interface 6. The NAND interface 6 includes a signal line output from the controller 3 to the NAND flash memory 2 and a signal line output from the NAND flash memory 2 to the controller 3. Further, the NAND interface 6 includes a channel, and the channel connects the NAND flash memory 2 and the controller 3. A plurality of channels may be provided, and the plurality of NAND flash memories 2 may be connected to one channel.

The controller 3 is configured as, for example, a system-on-a-chip (SoC), and includes a host interface circuit 31, a memory 32, a central processing unit (CPU) 33, a buffer memory 34, a NAND interface circuit 35, an ECC circuit 36, and an interface circuit 37 for an information processing terminal. The functions of each of portions 31 to 37 of the controller 3 may be implemented by hardware or may be implemented by a combination of hardware and firmware. The controller 3 is connected to the host device 4 through the host interface circuit 31, connected to the NAND flash memory 2 through the NAND interface circuit 35, and connected to the information processing terminal 5 through the interface circuit 37 for an information processing terminal. The information processing terminal 5 is, for example, a personal computer (PC) and is a terminal for analyzing failure of the memory system 1. Further, the host device 4 may also serve as the information processing terminal 5. The information processing terminal 5 is also referred to as an information processing device. The information processing device may include the host device 4.

The host interface circuit 31 connects the controller 3 and the host device 4, and transfers a request and data received from the host device 4 to a CPU 33 and a buffer memory 34, respectively. Further, in response to an instruction of the CPU 33, the data in the buffer memory 34 is transferred to the host device 4. The host interface circuit 31 performs an operation that is compliant with, for example, an SD® interface, a serial attached SCSI (small computer system interface) (SAS), a serial ATA (advanced technology attachment) (SATA), or a non-volatile memory express (NVMe®).

The memory 32 is a semiconductor memory such as a static random access memory (SRAM) and is used as a work area of the CPU 33. The memory 32 stores firmware for controlling the NAND flash memory 2, various management tables, or the like.

The CPU 33 controls an operation of the controller 3. For example, when the CPU 33 receives the write request from the host device 4, the NAND interface circuit 35 is instructed to write. When a read request is received from the host device 4, the NAND interface circuit 35 is instructed to read. When an erasing operation is received from the host device 4, the NAND interface circuit 35 is instructed to erase.

The buffer memory 34 is, for example, a dynamic random access memory (DRAM) and temporarily stores the write data and read data.

The NAND interface circuit 35 generates a command based on the instruction received from the CPU 33 and issues the generated command to the NAND flash memory 2. Specifically, when a write operation is performed, the NAND interface circuit 35 transfers the write command generated based on the instruction of the CPU 33 and the write data in the buffer memory 34 to the NAND flash memory 2. When performing a read operation, the NAND interface circuit 35 issues the read command generated based on the instruction of the CPU 33 to the NAND flash memory 2, and further transfers the data read from the NAND flash memory 2 to the buffer memory 34.

The NAND interface circuit 35 includes a counter 38 and a timer 39. The counter 38 counts a command number, for example, using a count-up method according to the instruction of the CPU 33, and a count value is counted up in the order in which the controller 3 executes the command, for example. The timer 39 measures the time according to the instruction of the CPU 33. When the time to be measured elapses, the timer 39 notifies the CPU 33 of an interruption. Further, the counter 38 and the timer 39 may be provided outside the NAND interface.

The ECC circuit 36 performs an error detection process and an error correction process related to the data stored in the NAND flash memory 2. That is, the ECC circuit 36 generates an error correction code when writing data, and assigns the generated code to the write data. When performing a read operation of data, the error correction code assigned to the write data is decoded and the presence or absence of an error bit is detected. When the error bit is detected, a position of the error bit is specified and the error is corrected. A method of the error correction includes, for example, a hard bit decoding and a soft bit decoding. As a hard bit decoding code used for the hard bit decoding, for example, a Bose-Chaudhuri-Hocquenghem (BCH) code or a Reed-Solomon (RS) code may be used. As a soft bit decoding code used for the soft bit decoding, for example, a low density parity check (LDPC) code may be used.

The interface circuit 37 for an information processing terminal connects the memory system 1 and the information processing terminal 5. The information processing terminal 5 communicates with the memory system 1 by, for example, a general-purpose interface such as RS232C or JTAG. The information processing terminal 5 is an electronic device used for failure analysis (e.g., debugging) of the memory system 1 and is, for example, a PC. When a failure occurs in the memory system 1, it is necessary to perform analysis to investigate the cause. The analysis is performed by connecting the memory system 1 and the information processing terminal 5. The information processing terminal 5 is used for the failure analysis of the memory system 1 by receiving log data from the memory system 1.

The temperature sensor 7 includes a temperature sensor for measuring the temperature of the controller 3 and a temperature sensor for measuring the temperature of the NAND flash memory 2. The temperature sensor for measuring the temperature of the controller 3 is disposed in the vicinity of the controller 3 or inside the controller 3. The temperature sensor for measuring the temperature of the NAND flash memory 2 is disposed in the vicinity of the NAND flash memory 2 or inside the NAND flash memory 2. Further, the temperature of the controller 3 and the NAND flash memory 2 may be measured by a single temperature sensor 7. The measured temperature is read by the controller 3.

Next, the configuration of the NAND flash memory 2 will be described. As shown in FIG. 1, the NAND flash memory 2 includes a memory cell array 21, a row decoder 22, a driver 23, a sense amplifier module 24, an address register 25, a command register 26, a sequencer 27, and a page buffer 28.

The memory cell array includes a plurality of memory cell transistors, each of which stores data in a non-volatile manner. A memory cell is connected to a word line and a bit line. The memory cell includes a memory cell transistor and stores data in a non-volatile manner according to a threshold voltage. A plurality of memory cells that are connected to one word line are referred to a memory cell group. When the memory cells store data of one bit per memory cell, the amount of data stored in the memory cell group is referred to as one page. When the memory cells store data of two bits per memory cell, the amount of data stored in the memory cell group is referred to as 2 pages. Further, the memory cell array 21 includes a plurality of data erasing areas called blocks BLK, and in FIG. 1, four blocks BLK0 to BLK3 are shown as an example. The block BLK includes a plurality of memory cell groups. The memory cell array 21 stores the data received from the controller 3.

The row decoder 22 selects one of the blocks BLK0 to BLK3 based on a block address in an address register 25 and further selects a word line in the selected block BLK.

The driver 23 supplies a voltage to a selected word line or the like via the row decoder 22 based on a page address in the address register 25.

The address register 25 stores the address received from the controller 3. This address includes the block address and the page address described above. The command register 26 stores the command received from the controller 3.

The sequencer 27 controls the operation of the NAND flash memory 2, such as the read operation of data and the write operation of data, based on the command stored in the command register 26.

The sense amplifier module 24 senses the current or the voltage flowing in the bit line when reading data. When a sense command is issued from the sequencer 27 when reading data, the driver 23 applies a read voltage to the selected word line in the memory cell array 21. The sense amplifier module 24 senses the current flowing in the bit line and reads the data. The read data is temporarily stored in the page buffer 28. When the sequencer 27 issues a data out command, the data stored in the page buffer 28 is output to the controller 3.

When writing data, the write data received from the controller 3 is temporarily stored in the page buffer 28 in response to the data in command issued from the controller 3. When the sequencer 27 issues a program command, the data stored in the page buffer 28 is written to the memory cell array 21.

Figure 2:
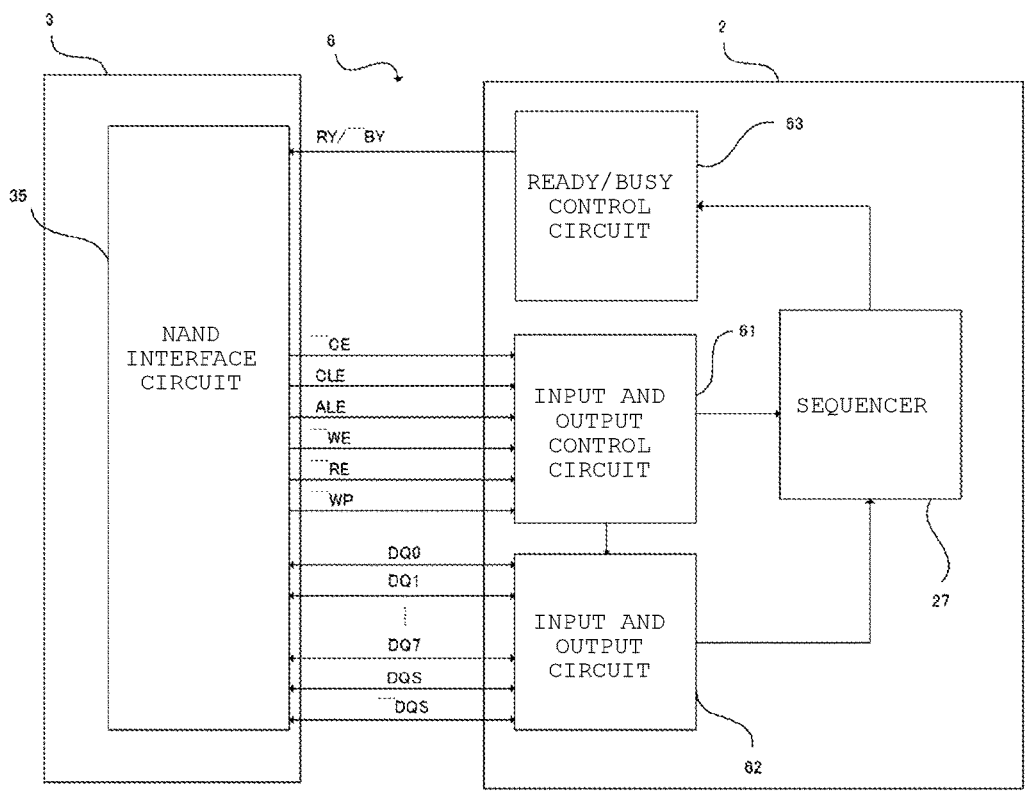
FIG. 2 is a diagram showing connections of a NAND interface according to the first embodiment.

FIG. 2 is a detailed description of the NAND interface 6 of the memory system 1. Configurations other than that described below shall be in accordance with FIG. 1. As shown in FIG. 2, the NAND flash memory 2 includes an input and output control circuit 61, an input and output circuit 62, and a ready/busy control circuit 63 in addition to the sequencer 27. The input and output control circuit 61, the input and output circuit 62, and the ready/busy control circuit 63 are connected to the controller 3 via the NAND interface 6. The NAND interface 6 transmits signals ⁻CE, CLE, ALE, ⁻WE, ⁻RE, ⁻WP, RY/⁻BY, signals DQ (DQ0 to DQ7), and data strobe signals DQS and ⁻DQS. In the present specification, the symbol "⁻" before the name of the signal means that it is asserted when the signal is at a low level.

The input and output control circuit 61 receives various control signals from the controller 3 and controls the input and output circuit 62 and the sequencer 27 based on the control signals. The control signal includes the signals ⁻CE, CLE, ALE, ⁻WE, ⁻RE, and ⁻WP. The controller 3 and the sequencer 27 are connected to each other via the input and output circuit 62. The input and output circuit 62 receives the signal DQ and transmits the signal DQ. Further, the input and output circuit 62 receives the data strobe signals DQS and ⁻DQS, and transmits the DQS and ⁻DQS. The ready/busy control circuit 63 can generate the signal RY/⁻BY based on an operating state of the sequencer 27. The signal RY/⁻BY is a signal used for notifying the controller 3 whether the NAND flash memory 2 is in a ready state during which an instruction from the controller 3 can be received or in a busy state during which an instruction from the controller 3 cannot be received.

The signal DQ (DQ0 to DQ7) is data having a width of, for example, 8 bits, and includes a command CMD, write data or read data DATA, an address ADD, and status data STS.

The asserted signal ⁻CE enables the NAND flash memory 2 by a low level. The asserted signal CLE notifies the NAND flash memory 2 that the signal DQ that is input to the NAND flash memory 2 in parallel with the CLE by a high level is a command CMD. The asserted signal ALE notifies the NAND flash memory 2 that the signal DQ that is input to the NAND flash memory in parallel with the ALE by a high level is an address signal. The asserted signal ⁻WE instructs the NAND flash memory 2 to write the input signal DQ to the command register 26 or the like by a low level in parallel with the ⁻WE. The asserted signal RE instructs the NAND flash memory 2 to output the signal DQ by a low level. The asserted signal ⁻WP instructs the NAND flash memory 2 to prohibit data write and erasing by a low level. The signal RY/⁻BY indicates whether the NAND flash memory 2 is in the ready state or the busy state, and indicates the busy state by a low level.

The signals DQS and ⁻DQS, which are transmitted from the controller 3 to the NAND flash memory 2, notify the NAND flash memory 2 of the timing to output the signal DQ. The signals DQS and ⁻DQS, which are transmitted from the NAND flash memory 2 to the controller 3, notify the controller 3 of the timing to output the signal DQ.

Next, the log data will be described. The log data is data including a history of the operation of the controller 3. There are two types of log data: firmware (FW) log data that describes a history of the operation of the CPU 33, and NAND access log data that describes a history of the commands for controlling the NAND flash memory. The NAND access log data includes both execution command log data that stores an internal command issued by the CPU 33 to the controller 3 and issuance command log data that stores a command which is issued by the controller 3 to the NAND flash memory 2. The execution command log data is, for example, a command for designating whether or not the controller 3 waits for the ready state of the NAND flash memory 2, and log data that stores the writing/reading of the data. The issuance command log data is, for example, log data that stores the write command and read command.

The format of the FW log data will be described with reference to FIG. 3. The FW log data is composed of, for example, 16 bytes, and the FW log data includes an FW log, a CPU type, an overflow flag, and a Timer. An access history from the CPU 33 to each module of the memory system 1 is written in the FW log. When the memory system 1 has a plurality of CPUs 33, a CPU 33 in which the log is generated is written in the CPU type. For the overflow flag, a flag is set when the overflow, which is described below, occurs. A count value that is counted by the counter 38 or a timer value measured by the timer 39 is written in the Timer, and the operation order of the CPU 33 is indicated.

The format of the NAND access log data will be described with reference to FIG. 4. The NAND access log data is composed of, for example, 8 bytes, and includes a NAND channel chip number, an overflow flag, a NAND access log type (NAND log type), NAND data (DQ), the Timer, and environmental information. In the NAND channel chip number, an identifier indicating the channel accessed by controller 3 and an identifier indicating the channel through which the NAND flash memory 2 is accessed are written. For the overflow flag, a flag is set when the overflow, which is described below, occurs. In the NAND access log type (NAND log type), information indicating the type of log included in the NAND data (DQ) field of the NAND access log is written. In the NAND data (DQ), the data transmitted from the controller 3 to the NAND flash memory 2 and the data transmitted from the NAND flash memory 2 to the controller 3 are written. In the Timer, the timer value measured by the timer 39 is written as a time stamp.

A count-up cycle of the timer 39 may be variable. For example, in the operation of frequently executing a command in which the NAND flash memory 2 is in a busy state for a short period of time, the controller 3 performs control such as shortening the count-up cycle of the timer 39. The control is performed, for example, by using a method of increasing the speed of the clock used for counting or a method of reducing the count value. Further, in the Timer, the count value counted by the counter 38 may be written. The controller 3 issues a command to the NAND flash memory 2, and the command numbers are counted in the order in which the NAND interface circuit 35 executes the command. In the environmental information, the temperature information around the controller, the temperature information of the NAND flash memory 2, or the voltage information of the controller 3 are written.

The format depicted in FIG. 4 is an example, and the format may be appropriately changed according to the signal width of the NAND interface or the required amount of data.

Figure 5:
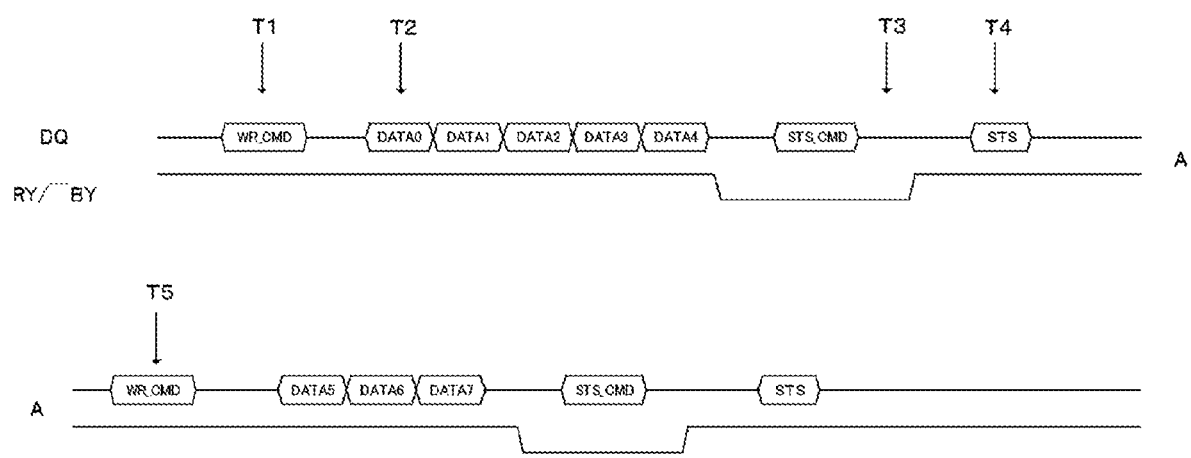
FIG. 5 is a timing chart of various signals when writing log data according to the first embodiment.

The contents of the log of the actual NAND access log data will be described with reference to FIGS. 5 and 6. FIG. 5 is a diagram representing states of the DQ signal of the NAND interface circuit 35 and the signal RY/ˉBY. The DQ in the figure shows a signal transmitted from the controller 3 to the NAND flash memory 2 and a signal transmitted from the NAND flash memory 2 to the controller 3. The command WR_CMD is issued at the time point T1 and at the time point T5 by the controller 3, the writing of user data to the NAND flash memory 2 is instructed two times, and the data DATA0 to DATA7 are transmitted after the time point T2. After issuing the command WR_CMD, the controller 3, before the time point T3 and after the time point T5, transmits the STS CMD to the NAND flash memory 2 in order to acquire the status information. After the received data is written in the memory cell array 21, the NAND flash memory 2 transmits the status information STS to the controller 3 at the time point T4 and after the time point T5.

Figure 6:
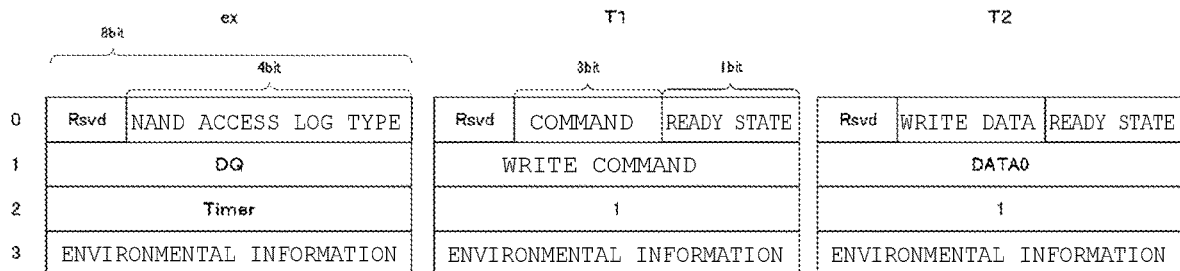
FIG. 6 is a diagram showing a format of the log data according to the first embodiment.
Figure 7:
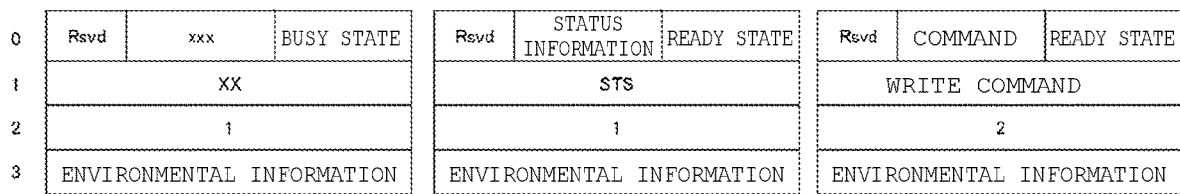
FIG. 7 is a diagram showing bit allocation of the log data according to the first embodiment.
Figure 7:
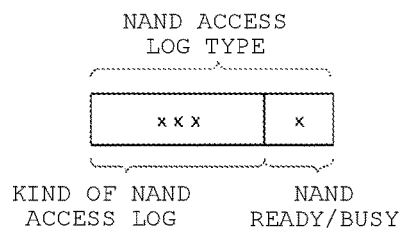

FIG. 6 represents the NAND access log data at the time from T1 to T5 shown in FIG. 5 with some omissions. An entry 0 is a reserved area Rsvd and the NAND access log type. An entry 1 represents the data transmitted via the DQ. An entry 2 is time information Timer, in which the count value counted by the counter 38 or the time stamp measured by the timer 39 is written. An entry 3 is environmental information, in which the temperature information of the memory system 1, the voltage information supplied to the controller 3, and the temperature information of the NAND flash memory 2 are written. FIG. 7 represents the NAND access log type in more detail. As shown in FIG. 7, the NAND access log type is 4 bits, of which bit 3:1 represents the type of access log. For example, it is assumed that 000 represents an address, 001 represents a command, 011 represents read data, 010 represents write data, and 100 represents a status. The bit 0 represents the ready/busy state of the NAND flash memory 2. For example, it is assumed that the ready state is represented by 1, and the busy state is represented by 0.

At time T1, the write command is transmitted from the controller 3, and the NAND flash memory 2 is in the ready state. At this time, in the NAND access log data, the fact that the NAND access log represents a command and that the NAND flash memory 2 is in the ready state is written. The DQ is a write command and the count value is 1. At time T2, the user data DATA0 from the controller 3 is transmitted via the DQ, and the NAND flash memory 2 is in the ready state. At this time, in the NAND access log data, the fact that the NAND access log represents the write data and that the NAND flash memory 2 is in the ready state is written. The DQ is the data DATA0 transmitted from the controller 3 to the NAND flash memory 2, and the count value is 1. At time T3, the user data received by the NAND flash memory 2 is written to the memory cell array 21, and the NAND flash memory 2 is in a busy state. At this time, in the NAND access log data, the fact that the NAND flash memory 2 is in a busy state is written. The count value is 1. At time T4, the status information STS from the NAND flash memory 2 is transmitted to the controller 3 via the DQ, and the NAND flash memory 2 is in the ready state again. At this time, in the NAND access log data, the fact that the NAND access log represents the status information and that the NAND flash memory 2 is in the ready state is written. The count value is 1. At time T5, a write command different from the command output at time T1 is transmitted, and the NAND flash memory 2 is in the ready state. At this time, in the NAND access log data, the fact that the NAND access log represents a command and that the NAND flash memory is in the ready state is written. The DQ is a write command and the count value is 2. Since the count values are counted up in the order in which the controller 3 executes the command, the count values at time T1 to T4 are 1, and the count value at time T5 is 2.

Description of Operation

Figure 8:
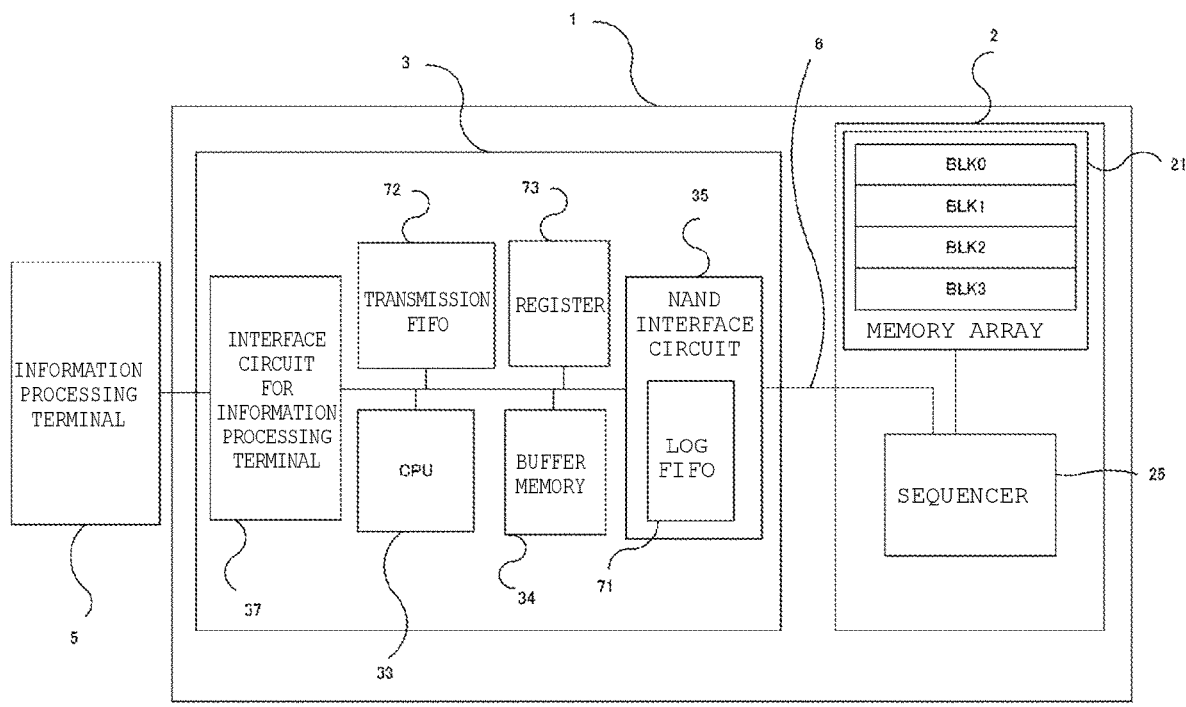
FIG. 8 is a block diagram of the memory system according to the first embodiment.

The transmission of the log data to the information processing terminal 5 will be described with reference to FIGS. 8 and 9. Hereinafter, the case where the log data is the NAND access log data will be described as an example, and the same applies to the case of the FW log data. Configurations other than that described below shall be in accordance with FIG. 1. FIG. 8 is a block diagram in which a part of the memory system is omitted. The controller 3 includes a plurality of memories including at least a log FIFO 71 and a transmission FIFO 72. The log FIFO 71 stores the log data of the memory system 1. For example, every time a command, an address, a status, or data is exchanged through the DQ, the log FIFO 71 stores the log data of the memory system 1. The transmission FIFO 72 stores the log data transferred from the log FIFO 71 and transmits the log data to the information processing terminal 5 through the interface 37 for an information processing terminal. The register 73 stores a trigger condition or the like which will be described later as a value. Further, the log FIFO 71 and the transmission FIFO 72 may be implemented in one memory.

Figure 9:
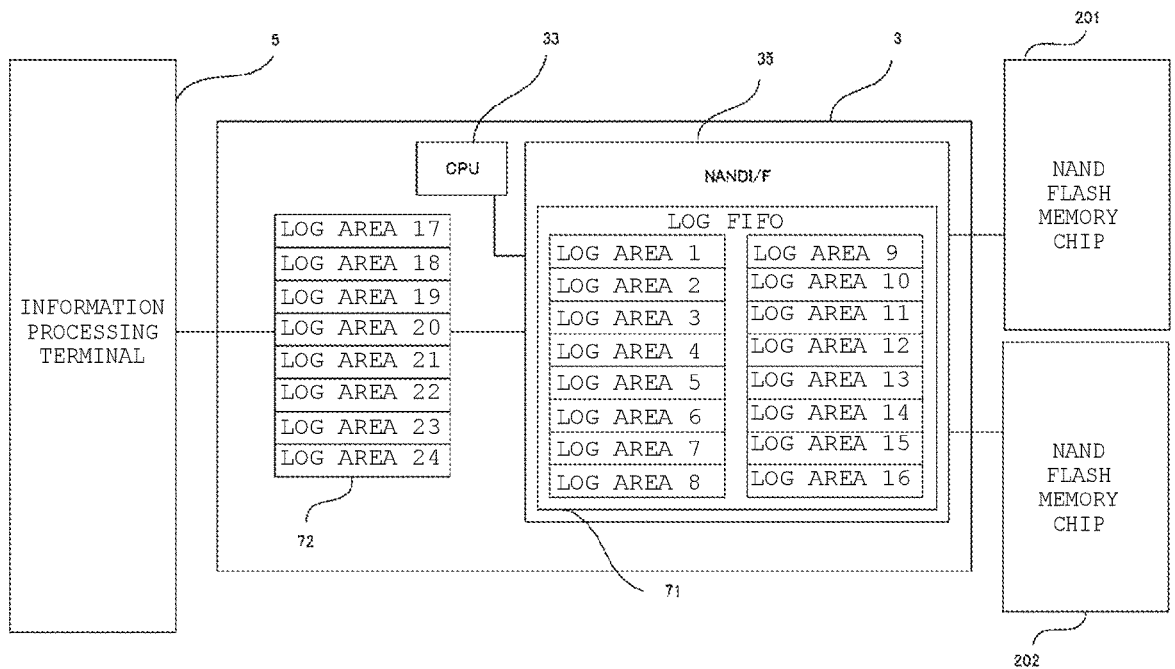
FIG. 9 is a block diagram of the memory system according to the first embodiment, illustrating FIFOs for storing log data in more detail.

FIG. 9 is a block diagram of the log FIFO 71 and the transmission FIFO 72. The NAND flash memory 2 includes a plurality of chips, and the NAND flash memory chips 201 and 202 are connected to the controller 3. The NAND access log data is managed by the log FIFO 71 or the transmission FIFO 72 by using a first-in, first-out (FIFO) method. The controller 3 writes the NAND access log data to the log FIFO 71. The log FIFO 71 is divided into a plurality of areas, and each of the areas corresponds to one of the respective NAND flash memory chips 201 and 202. For example, the NAND access log data with respect to the NAND flash memory chip 201 is written from the log area 1 to the log area 8 of the log FIFO 71. The NAND access log data with respect to the NAND flash memory chip 202 is written from the log area 9 to the log area 16 of the log FIFO 71. The controller 3 transfers the NAND access log data of the log FIFO 71 to the transmission FIFO 72 and then transmits the NAND access log data to the information processing terminal 5. Further, each of the overflow flag areas is provided in the log data.

The controller 3 may divide the log FIFO 71 into several sub FIFOs 710 (detailed in FIG. 10) according to the number of channels connected to the controller 3 and the number of memory chips of the NAND flash memory 2. That is, the controller 3 may change the capacity of the log FIFO 71 to be allocated according to the number of memory chips that are in the NAND flash memory 2.

Figure 10:
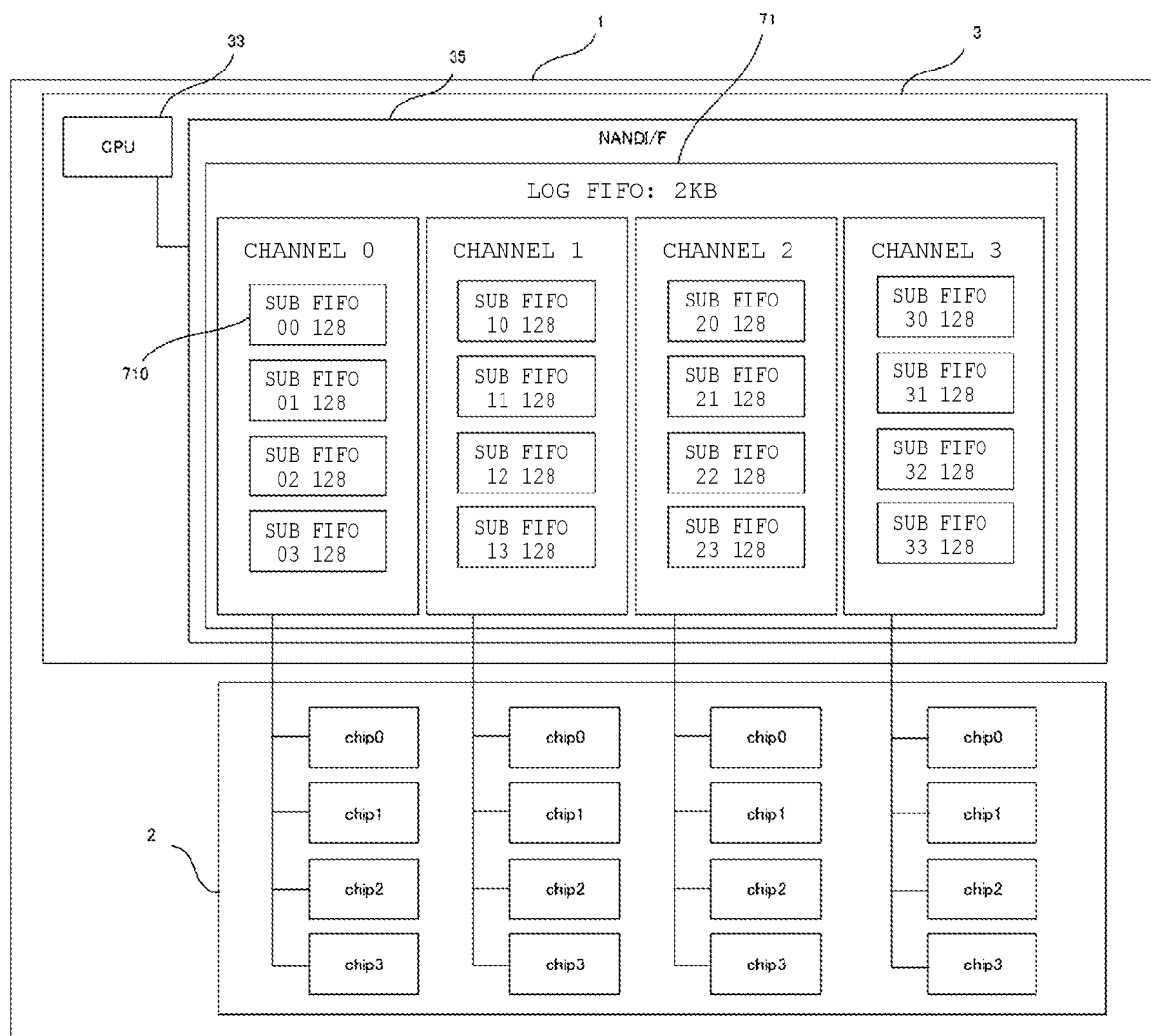
FIG. 10 is a block diagram of the memory system according to the first embodiment, illustrating connections between log data FIFO channels and different memory chips.
Figure 11:
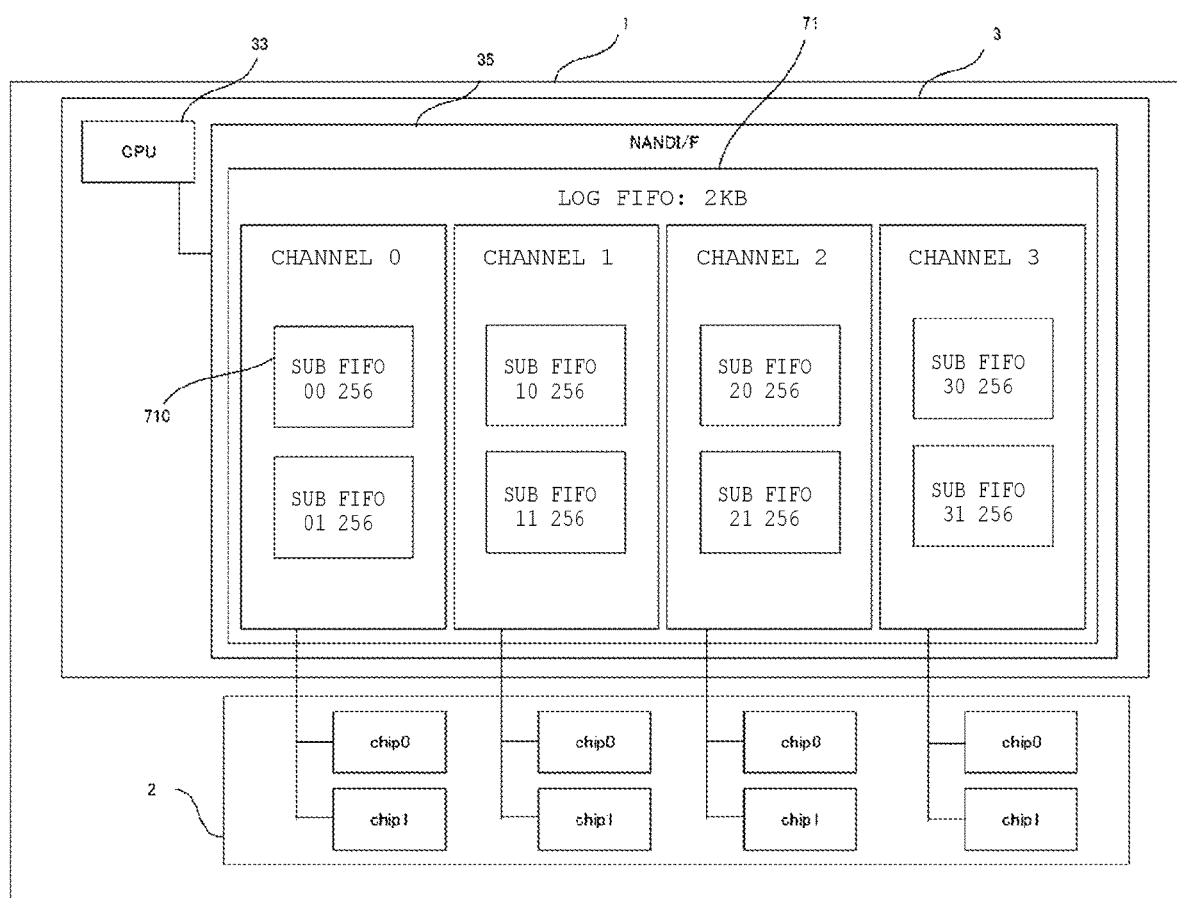
FIG. 11 is another block diagram of the memory system according to the first embodiment, illustrating connections between log data FIFO channels and different memory chips.

FIGS. 10 and 11 are block diagrams of the memory system. For example, it is assumed that the capacity of the log FIFO 71 is 2 Kbytes.

In FIG. 10, the controller 3 includes four channels, and four memory chips of the NAND flash memory 2 are connected to one channel. Each of the memory chips of the NAND flash memory 2 is a chip 0, a chip 1, a chip 2, and a chip 3. A 128-byte sub FIFO 710 (sub FIFO 00) is allocated to the chip 0 of the NAND flash memory 2 that is connected to the channel 0. A 128-byte sub FIFO 710 (sub FIFO 01) is allocated to the chip 1 of the NAND flash memory 2 that is connected to the channel 0. In this way, the 128-byte sub FIFO 710 is allocated with respect to one NAND flash memory 2.

As shown in FIG. 11, the controller 3 includes four channels, and when two memory chips, that is, a chip 0 and a chip 1, are connected to one channel, a 256-byte sub FIFO 710 is allocated to the chip 0 of one NAND flash memory 2.

Although the figure is omitted, similarly, when four channels are connected to the controller 3 and one memory chip is connected to one channel, a 512-byte sub FIFO 710 is allocated to the one memory chip of NAND flash memory 2. As described above, the controller 3 can change the capacity to allocate the sub FIFO 710 according to the number of channels and the number of chips of the NAND flash memory 2.

The controller 3 writes a command for controlling a memory chip of the NAND flash memory 2 to the storage area allocated to the memory chip. However, exceptional writing may be performed. For example, log data of a command that is an internal command for controlling the operation of the controller 3 and does not have a field for designating a memory chip, cannot be written in the storage area allocated to a specific memory chip. In that case, the controller 3 writes the same log data to a plurality of storage areas allocated to a plurality of memory chips.

Figure 12:
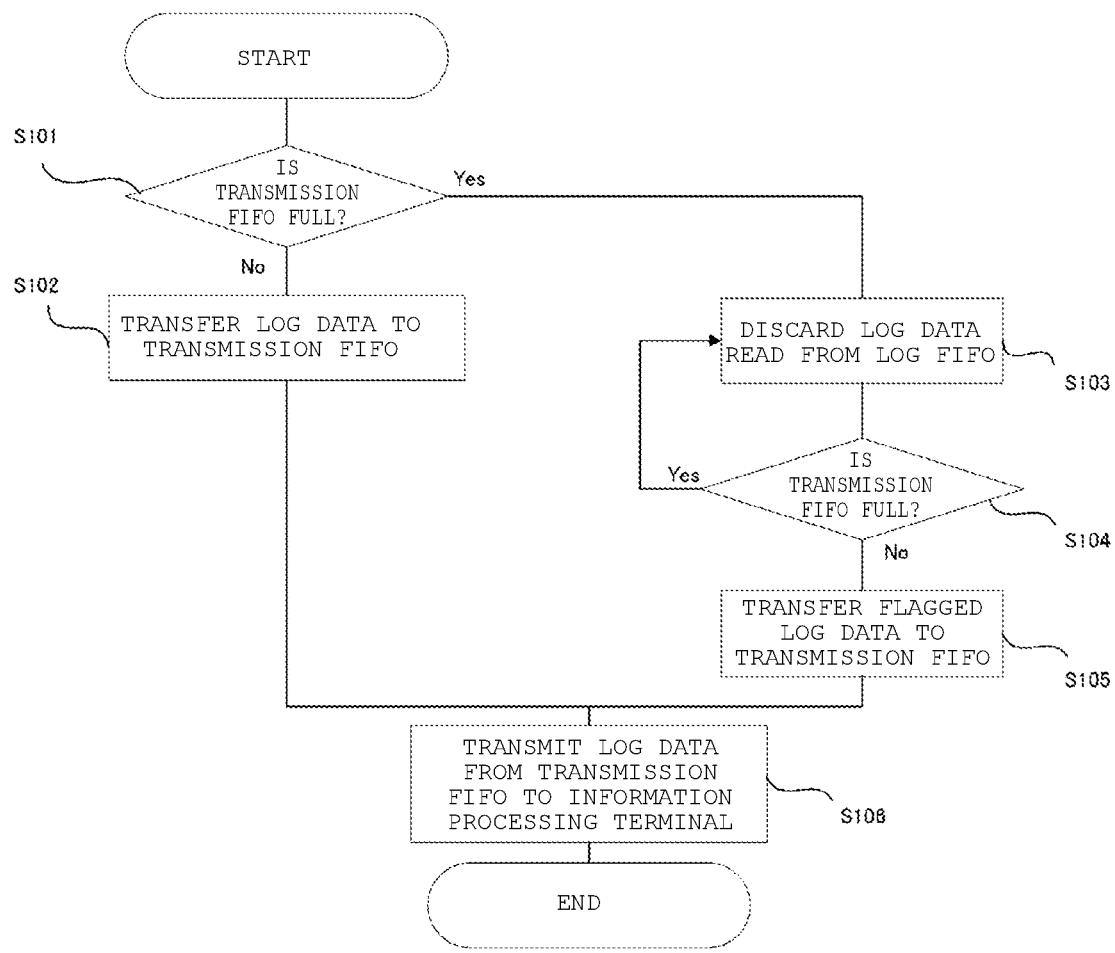
FIG. 12 is a flowchart of steps executed when transmitting the log data according to the first embodiment.

FIG. 12 is a flowchart of log data management. When transmitting the NAND access log data to the information processing terminal 5, depending on the transfer capacity between the information processing terminal 5 and the memory system 1, new NAND access log data may be about to be transferred from the log FIFO 71 to the transmission FIFO 72 before all the transmission of NAND access log data in the transmission FIFO 72 is completed. In the case of the process flow shown in FIG. 12, the controller 3 does not newly write the NAND access log data from the log FIFO 71 to the transmission FIFO 72 until the transmission of the NAND access log data which is previously written in the transmission FIFO 72 is completed. That is, when the transmission FIFO 72 is not full in transferring the log data from the log FIFO 71 to the transmission FIFO 72 (S101 No), the log data is transferred to the transmission FIFO 72 (S102), and the log data is transmitted from the transmission FIFO 72 to the information processing terminal 5 (S106). When the transmission FIFO 72 is full (S101 Yes), the controller 3 discards the log data read from the log FIFO 71 (S103). When the transmission of the data in the transmission FIFO 72 has completed so that the transmission FIFO 72 is not full (S104 No), the log data is transferred from the log FIFO 71 to the transmission FIFO 72. The controller 3 sets a flag in the overflow flag area of the log data to be transferred for the first time after the transmission FIFO 72 is full and the log data can be transferred to the transmission FIFO 72 (S105). The log data is transmitted from the transmission FIFO 72 to the information processing terminal 5 (S106). When the information processing terminal 5 receives the flagged log data, it recognizes that the unwritten and discarded log data exist before the flagged log data. When the discarded log data can be retransmitted, the information processing terminal 5 requests the controller 3 to retransmit the NAND access log data.

The controller 3 writes the NAND access log data to the log FIFO 71. For example, every time a command, an address, a status, or data is exchanged through the DQ, the log FIFO 71 stores the log data of the memory system 1. When the information processing terminal 5 is not connected, the controller 3 overwrites the log FIFO 71 with new NAND access log data.

Figure 13:
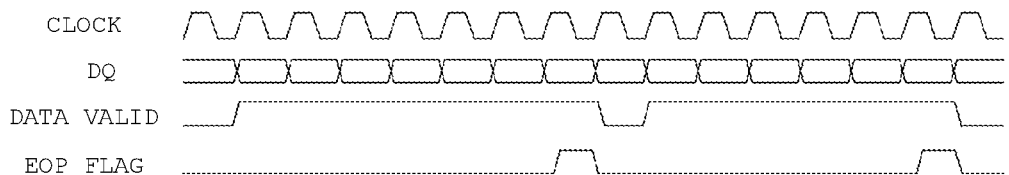
FIG. 13 is a timing chart of various signals when transmitting the log data according to the first embodiment.

FIG. 13 is a timing chart of various signals when transmitting the log data from the transmission FIFO 72 to the information processing terminal 5 via the interface circuit 37 for an information processing terminal. The log data is transmitted to the information processing terminal 5 according to the timing chart shown in FIG. 13. The interface for an information processing terminal includes, for example, a NAND access log terminal, a clock terminal, a DQ terminal, a data valid terminal, and an EOP flag terminal. The DQ terminal is, for example, 8 bits. When the NAND access log terminal is at a high level, the NAND access log data is transmitted via the DQ terminal, and when the NAND access log terminal is at a low level, the FW log data is transmitted via the DQ terminal. When transmitting the log data, the data valid becomes a high level. When the EOP flag terminal becomes a high level, it indicates the end of the log data, and the data valid terminal becomes a low level. With a cycle of invalid data in between, the data valid terminal becomes a high level, the EOP flag terminal becomes a low level, and another log data is transmitted. Instead of just one cycle, there may be a plurality of cycles of invalid data. The information processing terminal 5 performs intake of the log data from the controller 3 at the timing of the falling of the output clock terminal.

When either the FW log data or the NAND access log data is output to the information processing terminal 5, the condition for switching the type of log data may be an interrupt at the request of the host device 4, a switch of an external pin, or may be set by a register 73. Further, both the FW log data and the NAND access log data may be output to the information processing terminal 5.

Figure 14:
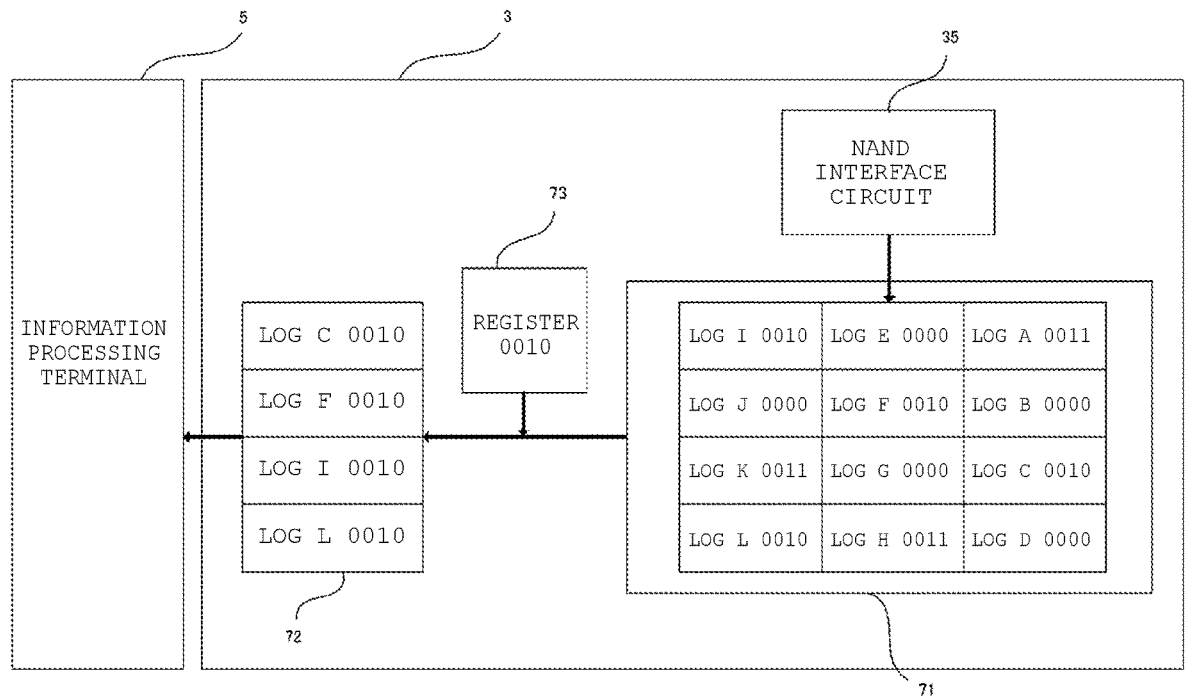
FIG. 14 is a block diagram of the memory system according to the first embodiment, in which a four-bit area is used to designate the type of log data stored in a transmission FIFO.

When a specific NAND log type is set in the register 73, only the NAND access log data corresponding to such type is output to the transmission FIFO 72. FIG. 14 is a block diagram of the memory system 1. Logs A to L, which are NAND access log data, include, for example, a 4-bit area representing the type of log data. The log is set as an address when it is 0000, set as a command when it is 0010, and set as read data when it is 0011. When a setting value for selecting a log is set in the register 73 and, for example, 0000 is set, only the log data representing the address (e.g., log C, log F, log I, and log L) is output to the transmission FIFO 72.

As the setting value of the register 73, only the log data in which the 4-bit value and the NAND log type value of the NAND access log data exactly match may be output, or alternatively, a plurality of types of log data in which a specific bit matches among 4 bits may be output. For example, when the register 73 is set to output the log data of bit 1, which is the second of the four bits, both the command of 0010 and the log data representing the read data of 0011 are output to the transmission FIFO 72.

Figure 15:
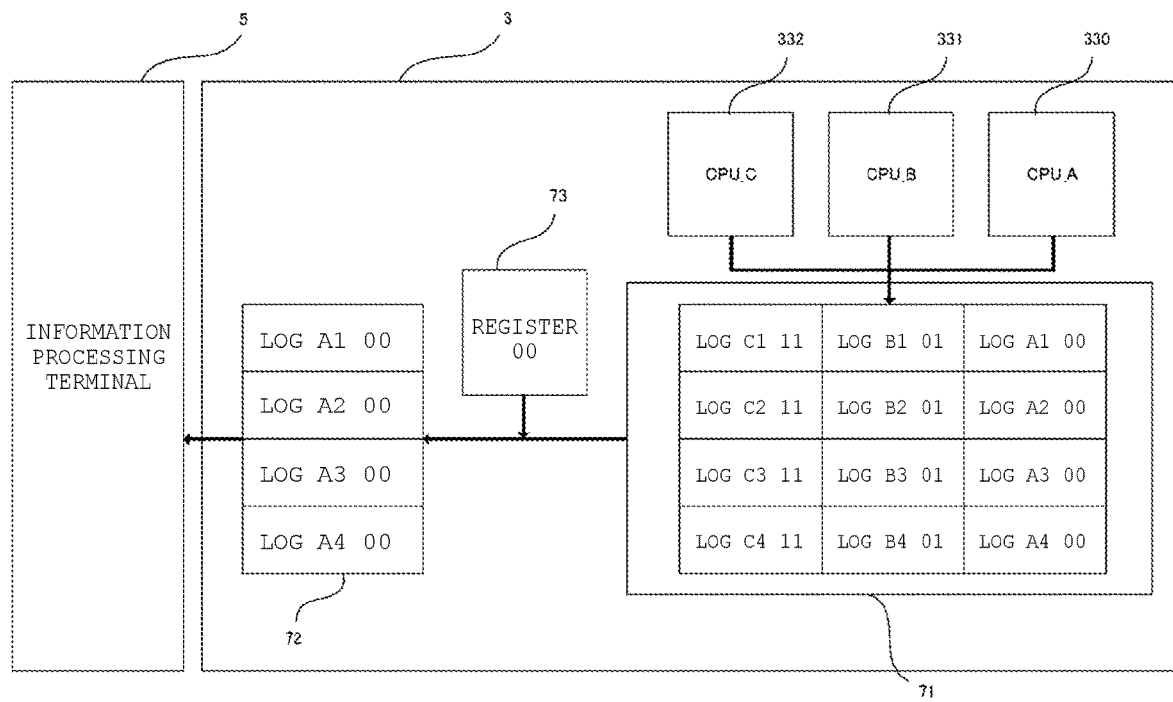
FIG. 15 is a block diagram of the memory system according to the first embodiment, in which a two-bit area is used to designate a CPU associated with the log data stored in a transmission FIFO.

Of the FW log data, only the FW log data corresponding to a specific CPU type may be set in the register 73 so as to be able to output to the transmission FIFO 72. FIG. 15 is a block diagram of a memory system 1 including three CPUs 330 to 332. The FW log data includes, for example, a 2-bit flag area representing the type of CPU of the log data, and is set as the CPU 330 when it is 00, set as the CPU 331 when it is 01, and set as the CPU 332 when it is 11. When a setting value for selecting a log is set in the register 73 and, for example, 00 is set, only the FW log data of the CPU 330 is output to the transmission FIFO 72.

As the setting value of the register 73, only the log data in which the 2-bit value and the CPU type value of the FW log data shown in FIG. 3 exactly match may be output, or alternatively, a plurality of types of log data in which a specific bit matches among 2 bits may be output. For example, when the register 73 is set to output the log data of bit 1, which is the first of the two bits, the FW log data of the CPU 331 and the CPU 332 are output to the transmission FIFO 72. Even when there are a plurality of CPUs, the FW log data of a specific CPU can be acquired.

Depending on the setting value of the register 73, specific log data are controlled to be output to the transmission FIFO 72. For example, when setting the output of NAND access log data, the third bit is set to 1 and the fourth bit is set to 0 in the register 73, and the write data 010x and the read data 011x are controlled not to be output to the transmission FIFO 72. This control may be a control that does not output only the log data in which the NAND log type value, or alternatively, the CPU type value and the setting value of the register 73 exactly match, or may be a control that does not output the log data in which the specific bits match. This control may be done by referring to the NAND log type only, or the CPU type only, or both the NAND log type and the CPU type.

The output of log data may be managed using a bitmap. The register 73 switches the presence or absence of the output to the transmission FIFO 72 for each of the bitmaps of the NAND log type or CPU log type.

Further, when the log data is transferred from the log FIFO 71 to the transmission FIFO 72, a trigger for the start and stop of the transfer of the log data may be set. The start and stop of the transfer are controlled by the controller 3.

A value set in advance by a user may be counted by the timer 39, and the trigger may be set when the set value is reached. For example, the trigger for the start and end of the transfer of the log data may be set as the value of the timer 39, with the start value set to t1 and the end value set to t2. When the value of the timer 39 reaches t1, the transfer of the log data from the log FIFO 71 to the transmission FIFO 72 is started. When the value of the timer 39 reaches t2, the transfer of the log data from the log FIFO 71 to the log FIFO 72 is stopped.

Further, an event may be the trigger. The event is, for example, a request from the information processing terminal 5 to the controller 3, a command from the controller 3 to the NAND flash memory 2, or an error that occurs when the command of the NAND flash memory 2 is executed. For example, the trigger for the start and end of the transfer of the log data is set as a command from the controller 3 to the NAND flash memory 2. A start event is defined as a read command of specific data, and an end event is defined as a write command. When the controller 3 issues a command to read the specific data to the NAND flash memory 2, the transfer of the log data from the log FIFO 71 to the transmission FIFO 72 is started. When the controller 3 issues a write command to the NAND flash memory 2, the transfer of the log data from the log FIFO 71 to the log FIFO 72 is stopped. The start trigger and the stop trigger may be a combination of the value of the timer 39 and the event, or only the start or the stop may be set.

The NAND access log data is log data output from the controller 3 to the log FIFO 71, and information such as the NAND ready/busy information or the status information may be written from the NAND flash memory 2 to a part of the NAND access log data. In other words, the NAND access log data may include information transmitted from the NAND flash memory 2 to the controller 3 in addition to the information transmitted from the controller 3 to the NAND flash memory 2. The status information is, for example, an execution result of the command or voltage information of the NAND flash memory 2. The voltage information is, for example, write, read, and erase voltages.

According to the embodiment described above, the information processing terminal 5 receives the FW log data and the NAND access log data from the memory system 1 and can use the log data for the failure analysis of the memory system 1. When a failure occurs in the memory system 1, a user or a developer can perform analysis and obtain the detailed information, so that the cause can be easily found.

Second Embodiment

The memory system according to a second embodiment makes the log data non-volatile. The operation of storing the log data in the buffer memory 34 will be described with reference to FIGS. 16 and 17.

Figure 16:
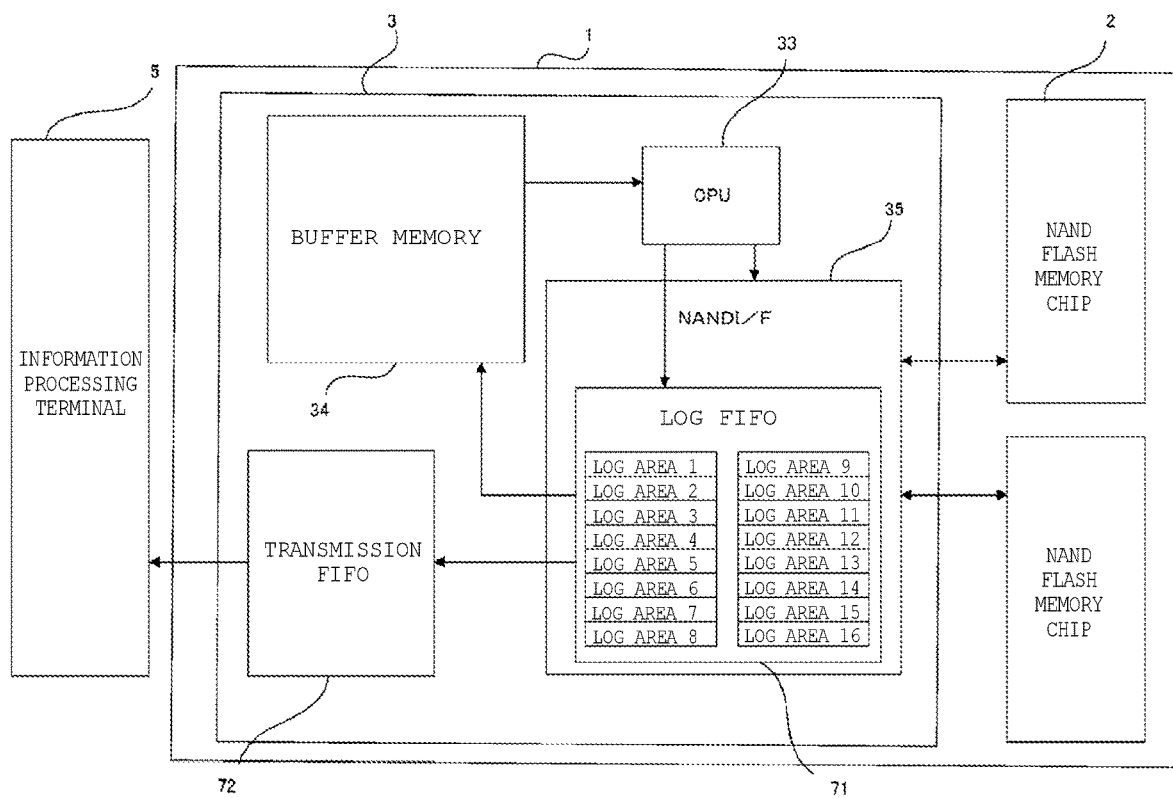
FIG. 16 is a block diagram of a memory system according to a second embodiment.

FIG. 16 is a block diagram in which a part of the memory system 1 is omitted. Configurations other than that described below shall be in accordance with FIG. 1. The controller 3 includes a buffer memory 34. When the controller 3 determines that an error occurs in the NAND flash memory 2, the controller 3 transfers the log data from the log FIFO 71 to the buffer memory 34. The log data temporarily stored in the buffer memory 34 is written to the NAND flash memory 2 and made non-volatile. At this time, the log data may be written in the user data storage area or may be written in the system area. Further, the NAND flash memory 2 to which the log data is written may be a memory chip where the error has occurred or a memory chip where the error has not occurred.

Figure 17:
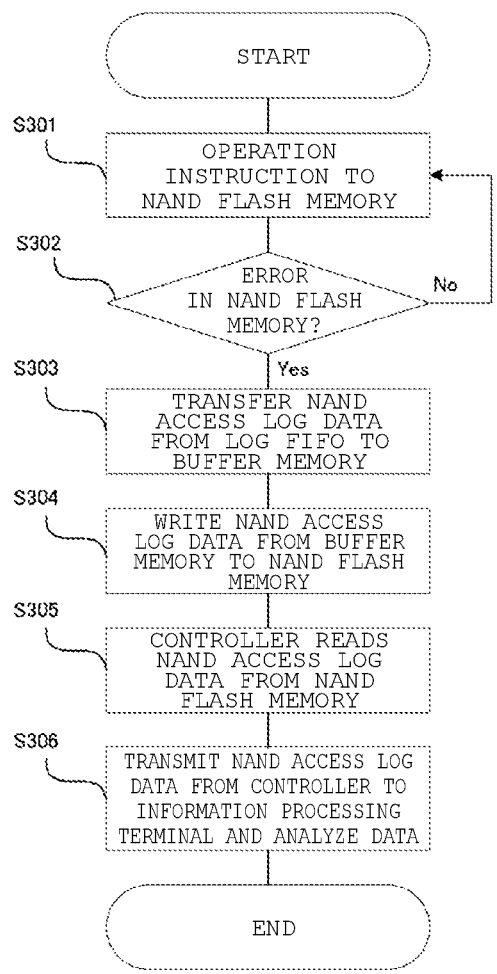
FIG. 17 is a flowchart of storing log data in a non-volatile memory according to the second embodiment.

FIG. 17 is a flowchart of an operation of storing the log data in the NAND flash memory 2. When the controller 3 instructs the NAND flash memory 2 to perform a write operation or a read operation (S301), and if no error occurs in the NAND flash memory 2 (S302 No), the NAND access log data is not transferred from the log FIFO 71 to the buffer memory 34. If an error occurs in the NAND flash memory 2 (S302 Yes), the controller 3 transfers the NAND access log data from the log FIFO 71 to the buffer memory 34 (S303).

The NAND access log data temporarily stored in the buffer memory 34 is written to the NAND flash memory 2 and made non-volatile (S304). When the information processing terminal 5 is connected, the controller 3 reads the NAND access log data from the NAND flash memory 2 (S305). The NAND access log data is transmitted from the controller 3 to the information processing terminal 5, and the NAND access log data is analyzed by the user or the developer (S306).

The transmission speed of transmitting the log data from the log FIFO 71 to the buffer memory 34 is faster than transmitting the log data from the log FIFO 71 to the information processing terminal 5. Therefore, in the second embodiment, it is possible to store the log data of a plurality of NAND flash memories 2 or a plurality of CPUs 33 by writing the log data, which is transmitted to the buffer memory 34, to the NAND flash memory 2 and making the log data non-volatile. Thus, even when the information processing terminal 5 is not connected, it is possible to store the log data at the time point when an error occurs in the NAND flash memory 2.

Third Embodiment

In the information processing system including the memory system according to a third embodiment, an expected value can be created using log data, and the memory system can be evaluated by comparing the log data with the expected value.

Figure 18:
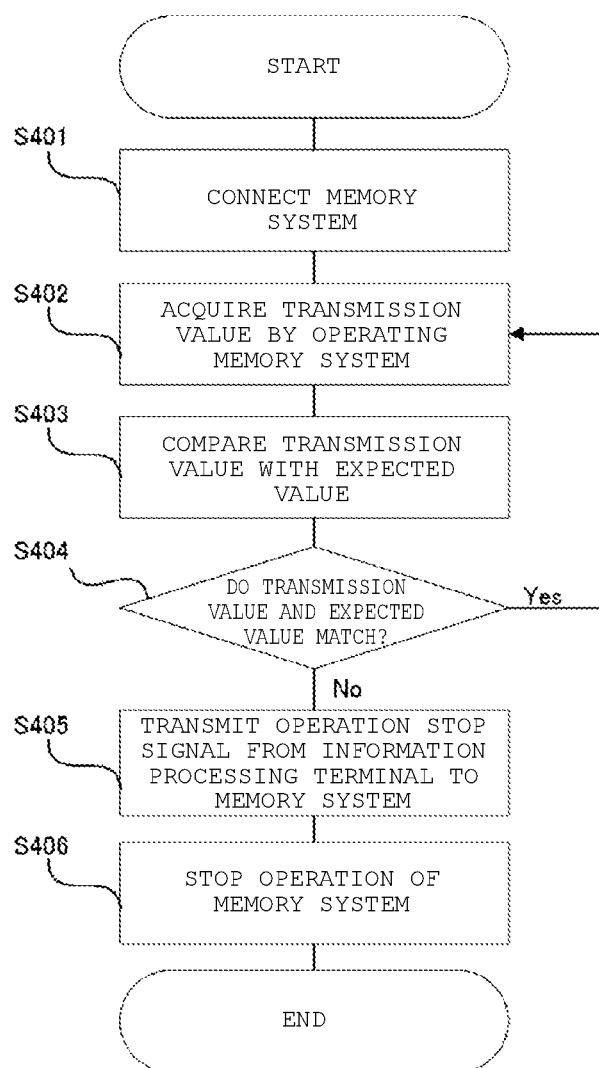
FIG. 18 is a flowchart of steps carried out to execute an evaluation function of a memory system according to a third embodiment.

FIG. 18 is a flowchart of steps carried out to execute an evaluation function of the memory system 1 to compare the log data and the expected value. When evaluating the memory system 1 during development or shipment, an expected value is created in advance from the log data stored when the memory system 1 is normally operated. The information processing terminal 5 stores the expected value of the created memory system 1 before evaluating the memory system 1, and when the memory system 1 to be analyzed is connected, the log data that is transmitted from the memory system 1 is compared with the expected value as a transmitted value, and the memory system 1 is evaluated. The trigger for the period of comparison between the transmitted value and the expected value may be time or an event. The log data used as the expected value and the transmitted value may be derived by the NAND access log data, the FW log data, a plurality of NAND access log data, a plurality of FW log data, or a combination of the NAND access log data and the FW log data.

The memory system 1 is connected to the information processing terminal 5 (S401), and a transmitted value is acquired by operating the memory system 1 (S402). The information processing terminal 5 compares the transmitted value with the expected value in the information processing terminal 5 (S403). When the expected value and the transmitted value match (S404 Yes), the memory system 1 continues to operate as it is. When the expected value and the transmitted value do not match (S404 No), the information processing terminal 5 transmits an operation stop signal to the controller 3 of the memory system 1 (S405), and the operation of the memory system 1 is ended (S406).

Further, the expected value may be read from the NAND flash memory 2 in the memory system 1. When performing the evaluation during shipment, the expected value of the memory system 1 itself is created and the created expected value is written to the NAND flash memory 2. When a failure occurs in the memory system 1 and analysis is required, the information processing terminal 5 reads the expected value from the NAND flash memory 2 and compares the expected value with the transmitted value of the actual operating memory system 1. As a result of the comparison, when the transmitted value and the expected value do not match, the information processing terminal 5 transmits an operation stop signal to the memory system 1. The log data used as the expected value and the transmitted value may be derived by the NAND access log data, the FW log data, a plurality of NAND access log data, a plurality of FW log data, or a combination of the NAND access log data and the FW log data.

When the expected value and the transmitted value are different, the information processing terminal 5 transmits a signal to the memory system 1 to stop the operation and stops the operation of the memory system 1. Thereby, it becomes easy to ascertain the state at the time point when the failure occurs in the memory system 1.

Fourth Embodiment

In the fourth embodiment, the external environmental information is written when the user data is written to the NAND flash memory, thereby the failure analysis becomes easier. The NAND flash memory 2 is easily affected by the external environment such as temperature and voltage when writing. The cause of the failure of the NAND flash memory 2 due to the external environment may not be specified only by the analysis using the log data. Therefore, when writing data to the NAND flash memory 2, the controller 3 writes the information about the external environment at the same time.

The process of writing the environmental information will be described with reference to FIGS. 19 and 20. The environmental information is, for example, the temperature information. Further, in the fourth embodiment, it is assumed that the temperature sensor 7 is provided inside the NAND flash memory 2. FIG. 19 is a diagram showing the data arrangement of blocks of the memory cell array 21. The NAND flash memory 2 is provided with a block, and the block has a plurality of pages. The pages are divided by a certain amount of data and offsets are assigned in order from the head. The user data and an error correction code which is generated from the user data are written in an area corresponding to each offset. A set of user data and an error correction code is called a frame. The page may have a redundant area where user data is not written.

Figure 20:
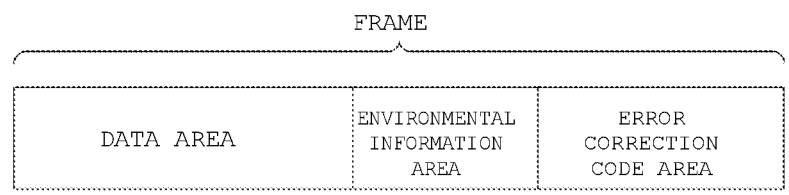
FIG. 20 is a diagram showing a write format of a frame according to the fourth embodiment.

An example of a format of a frame is shown in FIG. 20. A data area, an environmental information area, and an error correction code area are set from the head of the frame. User data that is sent from a host or system data used by the controller 3 are written in the data area. The temperature of the NAND flash memory 2 received by the controller 3 from the temperature sensor 7 is written in the environmental information area. The error correction code area is behind the data area and the environmental information area, and the error correction code is written in the error correction code area. The error correction code is generated from the data that is written in the data area and the environmental information area. When the user data is received from the host device 4, the controller 3 writes the data to the page of the NAND flash memory 2. When writing data, the controller 3 acquires the temperature information of the NAND flash memory 2 from the temperature sensor 7 and writes the temperature information in the environmental information area. Alternatively, the environmental information area and the error correction code area may be written in the redundant area.

According to the fourth embodiment, the temperature information when writing the user data is stored in the NAND flash memory 2. When a failure occurs in the memory system 1 and the user data cannot be read normally, the cause of the failure can be analyzed with reference to the temperature information written together with the user data.

Modification Example 1

In addition to the temperature information, the controller 3 writes time series information. The time series information is stored in the environmental information area. When the controller 3 receives the user data that is transmitted from the host device 4 and writes the user data to the NAND flash memory 2, the user data is ordered by the counter 38 inside the controller 3.

Figure 21:
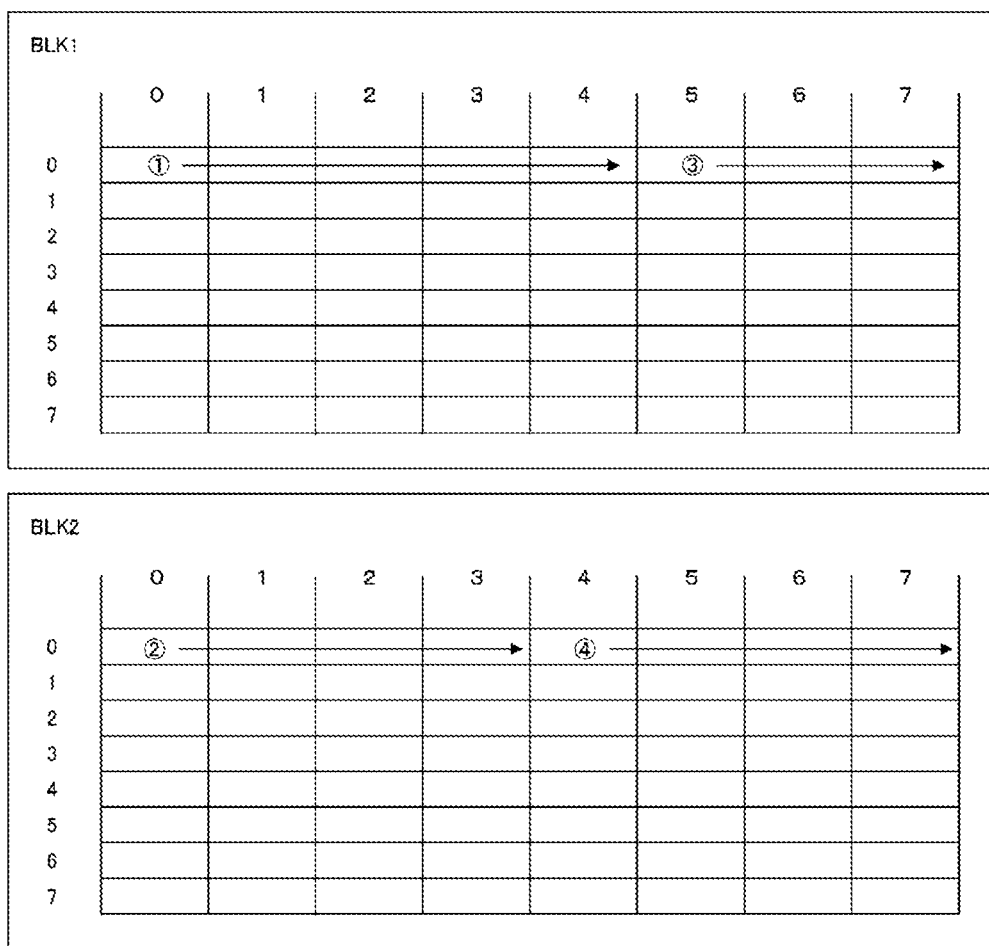
FIG. 21 is a diagram showing an arrangement of data stored in a block according to the fourth embodiment.

FIG. 21 is a diagram showing a writing order of data when the user data is written to a plurality of blocks. When the controller 3 receives the user data from the host device 4, the controller 3 writes the data to the block BLK of the NAND flash memory 2. At this time, it is assumed that (1) data is written at offsets 0 to 4 of a page 0 in a BLK1, (2) data is written at offsets 0 to 3 of a page 0 in a BLK2, (3) data is written at offsets 5 to 7 of the page 0 in the BLK1, and (4) data is written at offsets 4 to 7 of the page 0 in the BLK2. Numbers are written in the environmental information area in the order in which the data is written to the blocks BLK. That is, a counter number 1 is written in the environmental information area of the offsets 0 to 4 of the page 0 in the BLK1, and a counter number 2 is written in the environmental information area of the offsets 0 to 3 of the page 0 in the BLK2. Further, the order may be the order of requests from the host device 4 to the controller 3. For example, the host device 4 transmits the user data to the controller 3 and requests the writing. The counter sets a counter number to 1, and the counter number 1 is written in the environmental information of the offset. Next, when the host device 4 requests the controller 3 to write another user data, the counter 38 counts up the counter number. The counter number 2 is written in the environmental information of the offset.

When the memory system 1 includes a plurality of NAND flash memories 2, the user data received from the host device 4 is written across the plurality of NAND flash memories 2. Also at this time, before writing the user data to the NAND flash memory 2, the ordering numbers are assigned to the user data and stored in the environmental information area.

Figure 22:
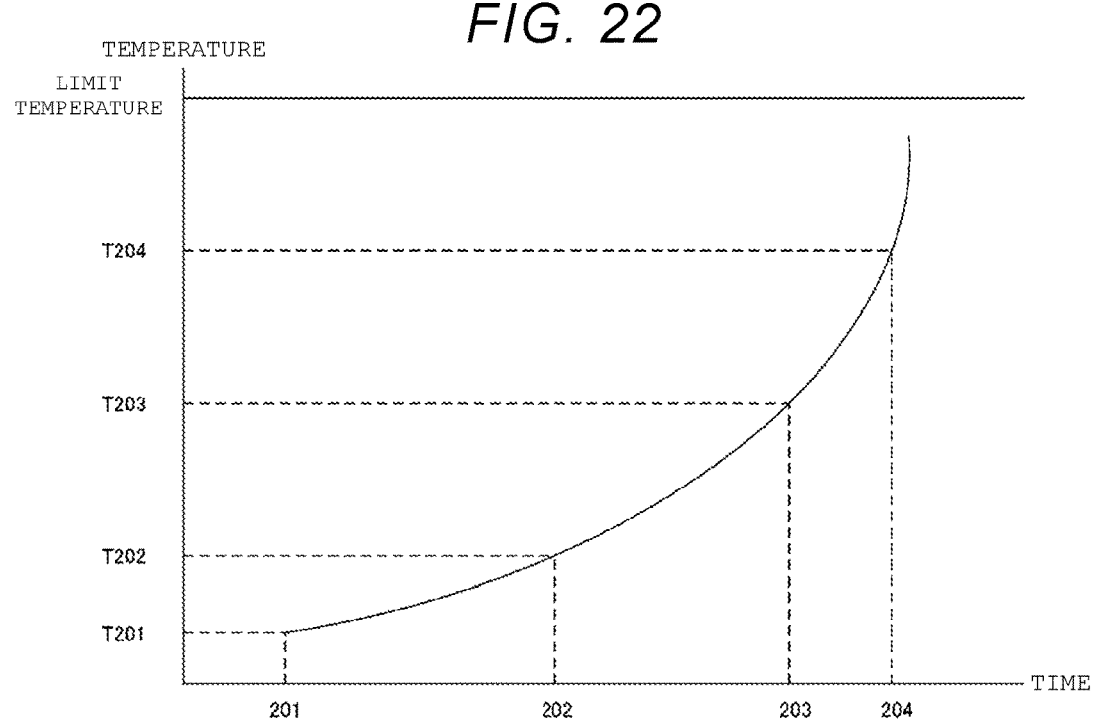
FIG. 22 is a graph of temperature and time according to the fourth embodiment.

By writing the time series information in addition to the temperature information to the environmental information area of the offset, a graph as shown in FIG. 22 can be created when the analysis is performed. Limit temperature is an upper limit of the temperature at which the NAND flash memory 2 normally operates. 201 to 204 represent the counter numbers of the offset, and T201 to T204 represent the temperature at each of the time points from 201 to 204. For example, when an error is detected in reading the data of 204 since T204 is close to the limit temperature, it can be inferred that there is a high possibility of a write error due to temperature. When an error occurs in the NAND flash memory 2, it is possible to know the state of temperature change by creating a temperature graph using the environmental information of the time series data around the error, thereby it becomes possible to determine whether the cause of the error is due to an external factor.

As the time series information, the time information may be used in addition to the counter value. When the memory system 1 is provided with a timer such as a Real-Time-Clock, the time information of the Real-Time-Clock is used as time series information. Further, the controller 3 may acquire the time information from the host device 4 and write the time information as time series information.

According to Modification Example 1, even when the user data is written across the blocks of the plurality of NAND flash memory 2 or the plurality of NAND flash memory 2, the cause of the failure can be analyzed based on the time series and the temperature information.

Modification Example 2

The memory system 1 performs a garbage collection (that is, compaction) for efficient use of the NAND flash memory 2. The garbage collection is an operation of copying valid data into an empty block in order to generate an erasable block. The garbage collection is performed by the controller 3. The data moved by the garbage collection has a new physical address that is different from the old physical address before the garbage collection. In Modification Example 2, the old physical address before the garbage collection is written together with the user data in the environmental information area of the frame. The old physical address includes a chip number, a block address, a page address, and an offset.

Figure 23:
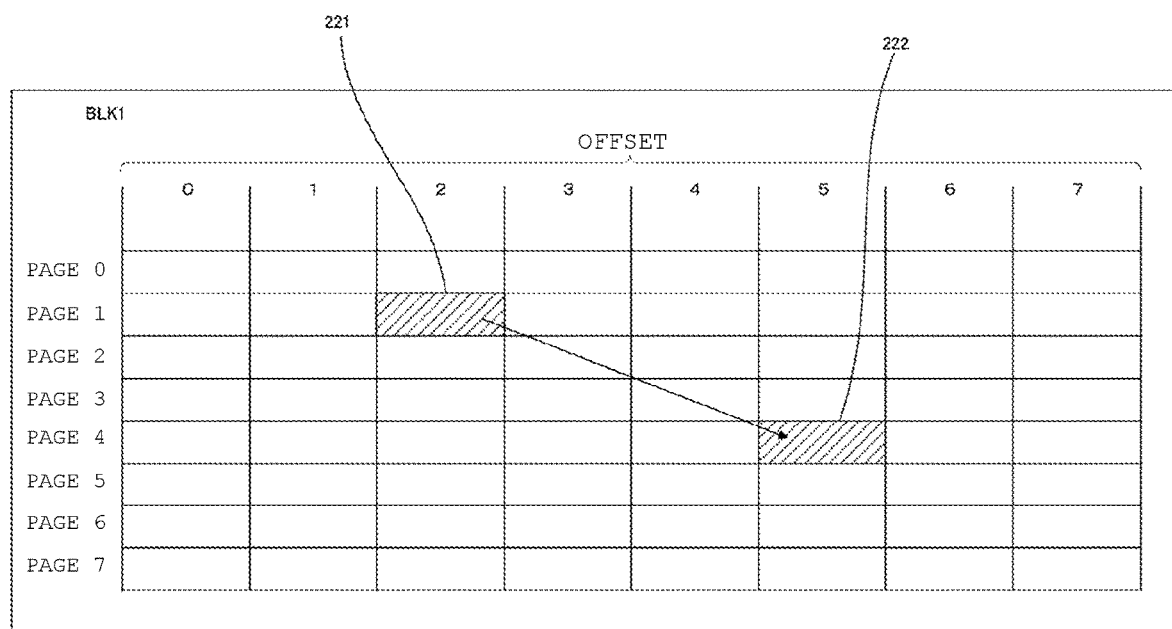
FIG. 23 is a diagram showing a movement of data according to the fourth embodiment.

FIG. 23 is a diagram showing the movement of the data by the garbage collection. When the data in the frame 221 is moved to the frame 222, the physical address of the frame 221 is written in the environmental information area of the frame 222. The physical addresses such as a block number 1, a page number 1, and an offset 2 are written in the environmental information area.

Further, the physical address of the user data is changed not only by the garbage collection but also by the refreshing or the wear leveling, for example. Even in this case, the old physical address before the change is written in the environmental information area.

By Modification Example 2, when erroneous data is read, it is easy to determine whether the erroneous data is written at the time of the change of the physical address or whether the erroneous data is written before the physical address is changed.

Modification Example 3

The environmental information area may store the temperature information, the time series information, and the physical addresses in any combination. Further, the size of the data of these environmental information is any size.

According to the above-described embodiment, it is easier to analyze the cause of a failure when the failure occurs in the memory system 1.

Fifth Embodiment

In a fifth embodiment, the size of the NAND access log data is changed according to the type of command stored in the log data. In the following description, the NAND access log data means execution log data in which internal commands are stored. FIG. 24A is an example of the log format of the NAND access log data. The memory system 1 of the present embodiment includes four planes (plane 0, plane 1, plane 2, and plane 3), and implements commands to collectively access the same page of a plurality of planes. In the first embodiment, a log format of 8 bytes NAND access log data as shown in FIG. 4 is used. The NAND access log data of the present embodiment includes a NAND access log type, a command, a control parameter, a block address, a page address, and a Timer. This NAND access log data is called a normal log. The normal log is 16 bytes. The NAND access log type information is 4-bit information representing the type and size of the NAND access log data.

The command field represents a command for the controller 3 to control the NAND flash memory 2. The command for controlling the NAND flash memory is, for example, a command issued by the controller 3 to the NAND flash memory 2 or a command in which the controller 3 waits for a response that the NAND flash memory 2 is in the ready state. The control parameter is used to designate options when issuing a command to the NAND flash memory and to control the operation of the controller. For example, the control parameter includes designating the number of bytes of the address to be issued to the NAND flash memory, designating whether to execute the error correction of the read data from the NAND flash memory and designating whether to issue the next command after the NAND flash memory is in the ready state. The block address and page address indicate the addresses of the NAND flash memory 2 to which data is written and read by commands, respectively. A block address 0 indicates a block address of the plane 0. A block address 1 indicates a block address of the plane 1. A block address 2 indicates a block address of the plane 2. A block address 3 indicates a block address of the plane 3. Further, a page address field indicates a page address in the block. The commands that collectively access the plurality of planes may have the same block address. For the NAND access log data of this command, duplicate block addresses may be omitted.

FIG. 24B shows NAND access log data of a command that accesses the four planes 0, 1, 2, and 3 at the same time and accesses the block address 0. A log in which addresses after the block address 1 are omitted, such as this NAND access log data, is called a shortened log. The shortened log when the block addresses of the four planes are the same is 10 bytes. The NAND access log type of the 10-byte shortened log is "0001".

The command for accessing the NAND flash memory 2 includes a command having no address. For the NAND access log data of the command having no address, as shown in FIG. 24C, the area indicating the address is omitted, and the size is 6 bytes. The NAND access log type of such 6-byte NAND access log data is "0011".

Further, the controller 3 may omit writing the command log during the burst transfer to the log FIFO 71. FIG. 24D is an example of the format of the NAND access log data written in the log FIFO 72 at the start and end of the burst transfer. The NAND access log data stored when the burst transfer is performed is called a burst log. The burst transfer is an operation in which the controller 3 designates the addresses of the page at which reading starts and the page at which reading ends, and reads data in the order of addresses from all pages between the address of the page at which reading starts and the address of the page at which reading ends.

When the burst transfer is started, a burst head command is transmitted to the NAND flash memory 2. A read command is transmitted to the NAND flash memory 2 during the read operation of data in the order of addresses during the burst transfer. When the burst transfer is ended, a burst end command is transmitted to the NAND flash memory 2. The burst head command is a command that designates the first page of the burst transfer and instructs the NAND flash memory 2 to read the data on the first page and continuous pages and transfer the read data. The burst end command is a command that designates the last page of the burst transfer and instructs the NAND flash memory 2 to read the data on the last page and transfer the read data. The log of the burst head command has, for example, "1010" in the log type information, and the log of the burst end command is "1011". When performing the burst transfer, the burst log of the burst head command, the burst log of the read command during burst transfer, and the burst log of the burst end command are stored in the log FIFO 71.

When the CPU 33 detects the burst transfer, the CPU 33 controls the log FIFO 71. Based on the control of the CPU 33, the log FIFO 71 does not store the normal log of the read command from the burst head command to the burst end command being transmitted.

Figure 25:
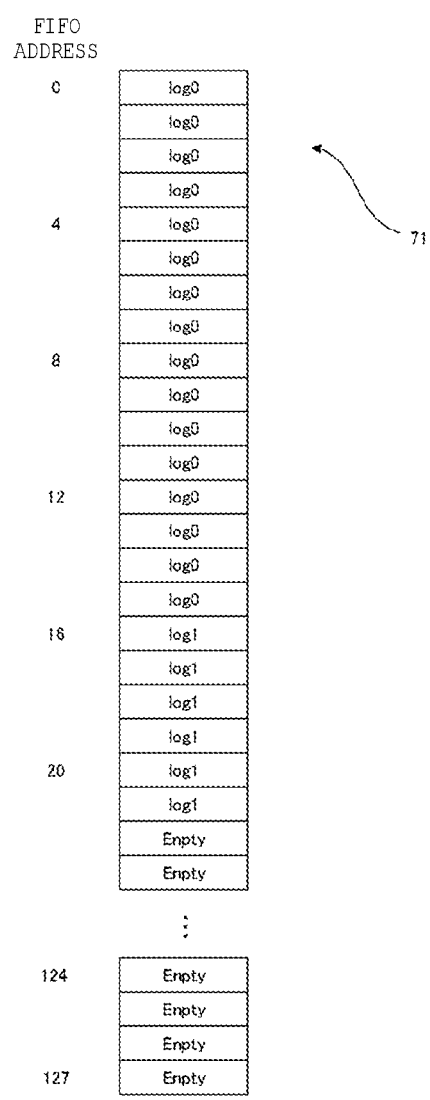
FIG. 25 is a block diagram of a log FIFO according to the fifth embodiment.

When the log size is constant, the minimum management unit for the log FIFO 71 and the transmission FIFO 72 is the same as the log size. When the size of the log is changed according to the command included in the log data, the controller 3 manages the minimum management unit of the log FIFO 71 and the transmission FIFO 72 as 1 byte. FIG. 25 is a block diagram of the log FIFO 71 having a capacity of 128 bytes. The FIFO address represents the address of the write destination of the log in the log FIFO 71. It is assumed that a first log is log0 and a second log is log1. The controller 3 identifies the type or size of the log from the log type information and writes the NAND access log data to the log FIFO 71. The log0 is identified as 16 bytes from the log identification information and is written in an area from the FIFO addresses 0 to 15. The log1 is identified as 6 bytes from the log identification information and is written in an area from the FIFO addresses 16 to 21. Further, when a log is written in excess of the capacity of the log FIFO 71, the NAND access log data that could not be written is written from the head as in the first embodiment. For example, the log FIFO 71 having a capacity of 128 bytes writes the NAND access log data up to the FIFO address 127 and then writes the NAND access log data from the FIFO address 0 again. The log that has previously been written is overwritten with a new log. The same applies to the transmission FIFO 72.

According to the fifth embodiment, it is possible to improve the use efficiency of the log FIFO 71 and the transmission FIFO 72 by changing the size of the log. Further, although the embodiment when accessing the four planes at the same time is mentioned here, the simultaneous access is not limited to the four planes. The handling of the burst log also applies when accessing one plane by itself.

According to the above-described embodiment, it is easier to analyze the cause of a failure when the failure occurs in the memory system 1.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a non-volatile memory; and
   a controller that includes a first memory and a second memory, and is configured to control the non-volatile memory and write log data to the first memory, the log data including a history of commands for controlling the memory system, wherein the controller is further configured to write the log data from the first memory to the second memory and to write the loci data from the second memory to the non-volatile memory in response to an error in the non-volatile memory that occurs when one of the commands is executed.

2. The memory system according to claim 1, wherein the log data is written each time the controller issues a command to the non-volatile memory.

3. The memory system according to claim 1, wherein the commands include a command to the non-volatile memory including an instruction of a write operation, an erase operation, or a read operation.

4. The memory system according to claim 1, wherein the log data further includes temperature information of the controller or the non-volatile memory, or an issuance order of the commands of the controller.

5. The memory system according to claim 1, further comprising a bus, wherein the bus includes a signal line output from the controller to the non-volatile memory and a signal line output from the non-volatile memory to the controller, the commands are transmitted by the signal line output from the controller to the non-volatile memory, and the log data further includes a status of the non-volatile memory transmitted by the signal line output from the non-volatile memory to the controller.

6. The memory system according to claim 1, further comprising:

a first interface connected to an information processing device, wherein the controller is configured to transmit the log data from the first memory to the information processing device via the first interface.

7. The memory system according to claim 1, wherein the non-volatile memory includes a plurality of memory chips, the controller is configured to logically divide the first memory into a plurality of areas, each of which corresponds to one of the memory chips, and the controller is configured to store a log of a command issued to one of the plurality of memory chips at least in one area corresponding to the one memory chip among the plurality of areas.

8. The memory system according to claim 1, wherein the non-volatile memory includes a plurality of planes that the controller is able to access at the same time, the plurality of planes including a plurality of blocks which are units of erasure, the commands including addresses that designate the plurality of blocks, and when the controller designates a block address that is common to the plurality of planes by using the commands, the controller writes log data in which duplicate block addresses of the commands are omitted, to the first memory.

9. The memory system according to claim 1, wherein the controller is configured to write the log data having different sizes depending on a type of command stored therein.

10. A memory system comprising:
a non-volatile memory; and
a controller that includes a first memory and a second memory, and is configured to control the non-volatile memory and write loci data to the first memory, the loci data including a history of commands for controlling the memory system, wherein the controller is further configured to start writing the log data from the first memory to the second memory in response to satisfaction of a first trigger condition and to stop writing the log data from the first memory to the second memory in response to satisfaction of a second trigger condition.

11. The memory system according to claim 10, wherein the controller includes a timer, and at least one of the first trigger condition and the second trigger condition is that a value of the timer is a first value.

12. The memory system according to claim 10, wherein the log data includes a flag area, after the first trigger condition is satisfied and before the second trigger condition is satisfied, when the second memory is full, the controller is configured to discard the log data that is read from the first memory, and when a state of the second memory changes from a full state to a non-full state, the controller sets a flag in the flag area of the log data that is first written from the first memory to the second memory after the state of the second memory changed.

13. The memory system according to claim 12, wherein the flag notifies an information processing device of an existence of discarded log data.

14. The memory system according to claim 10, wherein at least one of the first trigger condition and the second trigger condition is an error which occurs when the non-volatile memory executes one of the commands.

15. The memory system according to claim 10, further comprising a bus, wherein the bus includes a signal line output from the controller to the non-volatile memory and a signal line output from the non-volatile memory to the controller, the commands are transmitted by the signal line output from the controller to the non-volatile memory, and the log data further includes a status of the non-volatile memory transmitted by the signal line output from the non-volatile memory to the controller.

16. The memory system according to claim 10, further comprising:

a first interface connected to an information processing device, wherein the controller is configured to transmit the log data from the first memory to the information processing device via the first interface.

17. A memory system comprising:
a non-volatile memory; and
a controller that includes a first memory and a second memory, and is configured to control the non-volatile memory and write loci data to the first memory, the log data including a history of commands for controlling the memory system, wherein the second memory includes a plurality of areas, the controller is configured to write the log data from the first memory into the plurality of areas by using a first-in first-out method and then transmit the log data from at least one of the plurality of areas of the second memory to an information processing device, and before the log data, which is written in a first area that is one of the plurality of areas, is transmitted to the information processing device, when a new log data is overwritten in the first area, the controller transmits a flag indicating that the log data is overwritten, to the information processing device.

18. The memory system according to claim 17, wherein the log data is written each time the controller issues a command to the non-volatile memory.

19. The memory system according to claim 17, wherein the log data further includes temperature information of the controller or the non-volatile memory, or an issuance order of the commands of the controller.

20. The memory system according to claim 17, further comprising a bus, wherein
the bus includes a signal line output from the controller to the non-volatile memory and a signal line output from the non-volatile memory to the controller,
the commands are transmitted by the signal line output from the controller to the non-volatile memory, and
the log data further includes a status of the non-volatile memory transmitted by the signal line output from the non-volatile memory to the controller.

* * * * *